(12) United States Patent
Watanabe et al.

(10) Patent No.: US 8,364,044 B2
(45) Date of Patent: Jan. 29, 2013

(54) TRANSMISSION SYSTEM FOR IMAGE DISPLAY DEVICE AND ELECTRONIC EQUIPMENT

(75) Inventors: Takahiro Watanabe, Osaka (JP); Kazuhito Nagura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 292 days.

(21) Appl. No.: 12/761,881

(22) Filed: Apr. 16, 2010

(65) Prior Publication Data

US 2010/0290789 A1    Nov. 18, 2010

(30) Foreign Application Priority Data

May 14, 2009   (JP) .................... 2009-117549

(51) Int. Cl.
*H04B 10/00* (2006.01)
(52) U.S. Cl. .................... 398/164; 398/138; 398/139
(58) Field of Classification Search .......... 398/141–143, 398/145, 164, 138, 139
See application file for complete search history.

(56) References Cited

U.S. PATENT DOCUMENTS

| | | | | |
|---|---|---|---|---|
| 6,538,785 | B1 * | 3/2003 | Kim et al. ................. | 398/140 |
| 6,657,622 | B2 | 12/2003 | Park | |
| 7,478,954 | B2 * | 1/2009 | Cho et al. ................. | 385/89 |
| 7,780,359 | B2 * | 8/2010 | Kondo et al. ............. | 385/88 |
| 8,054,412 | B2 * | 11/2011 | Yamamoto et al. ....... | 349/86 |
| 2006/0251421 | A1 * | 11/2006 | Arnon ....................... | 398/73 |
| 2009/0219263 | A1 * | 9/2009 | Shino et al. ............... | 345/204 |
| 2010/0119236 | A1 * | 5/2010 | Uno et al. ................. | 398/141 |
| 2010/0266276 | A1 * | 10/2010 | Zheng et al. .............. | 398/43 |

FOREIGN PATENT DOCUMENTS

| | | |
|---|---|---|
| JP | 2001-21913 A | 1/2001 |
| JP | 2002-91367 A | 3/2002 |
| JP | 2002-268576 A | 9/2002 |
| JP | 2003-337550 A | 11/2003 |
| JP | 2008-233452 A | 10/2008 |
| JP | 2008-241748 A | 10/2008 |
| KR | 10 2008 0049881 A | 6/2008 |
| WO | WO 2008126755 A1 * | 10/2008 |

* cited by examiner

*Primary Examiner* — Dalzid Singh
(74) *Attorney, Agent, or Firm* — Birch, Stewart, Kolasch & Birch, LLP

(57) ABSTRACT

A transmission system for an image display device has a first circuit board and a second circuit board, a flexible member for connecting the first circuit board and the second circuit board, an image display driver IC mounted on the first circuit board or the flexible member, an image processing IC mounted on the second circuit board, and an optical transmission path. At least part of signals to be transmitted between the image display driver IC and the image processing IC is transmitted as an optical signal.

3 Claims, 25 Drawing Sheets

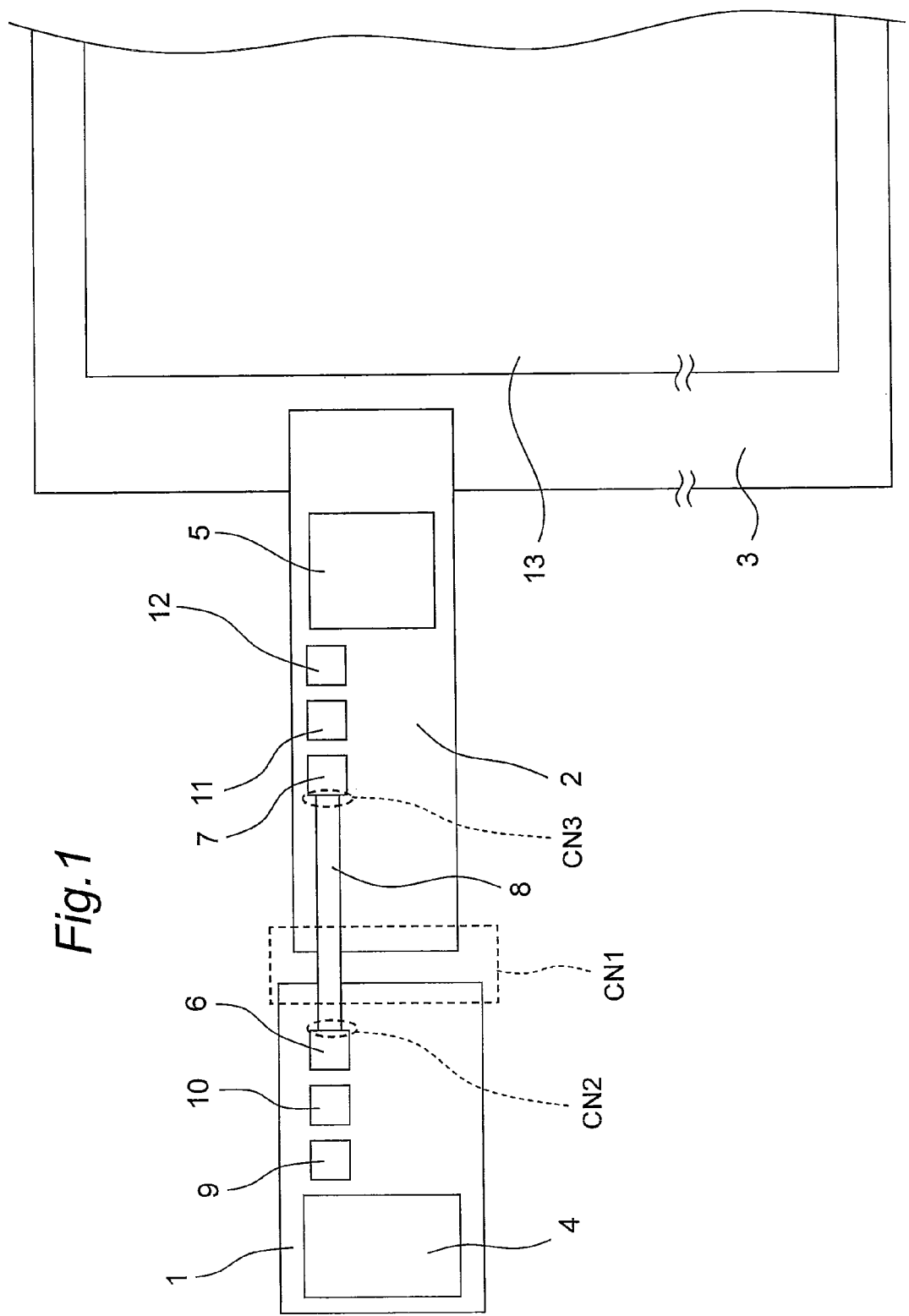

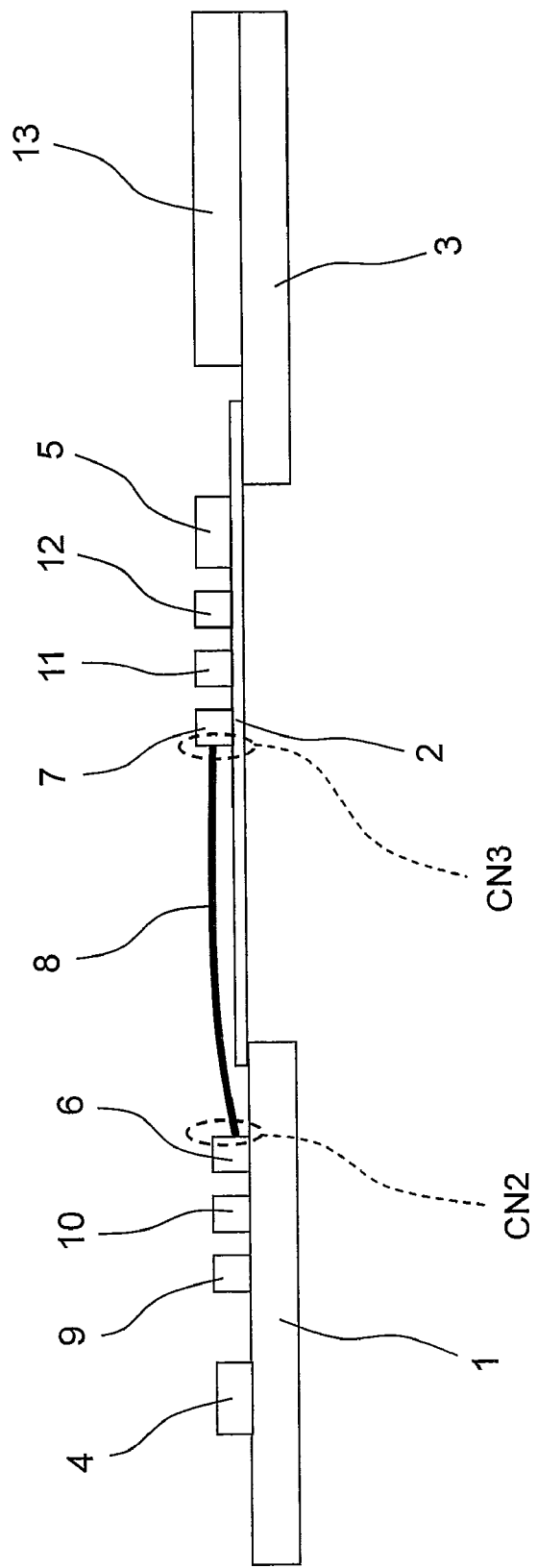

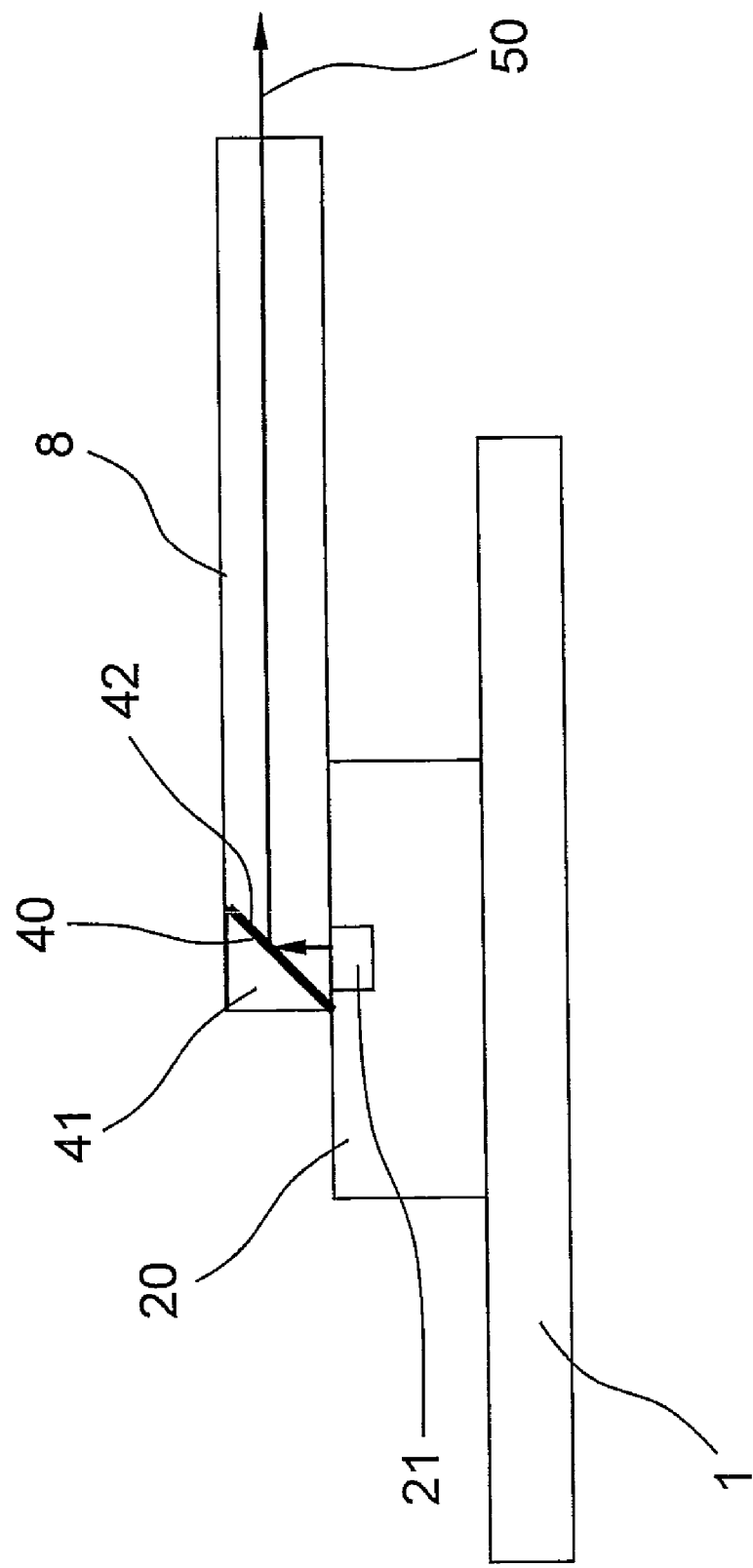

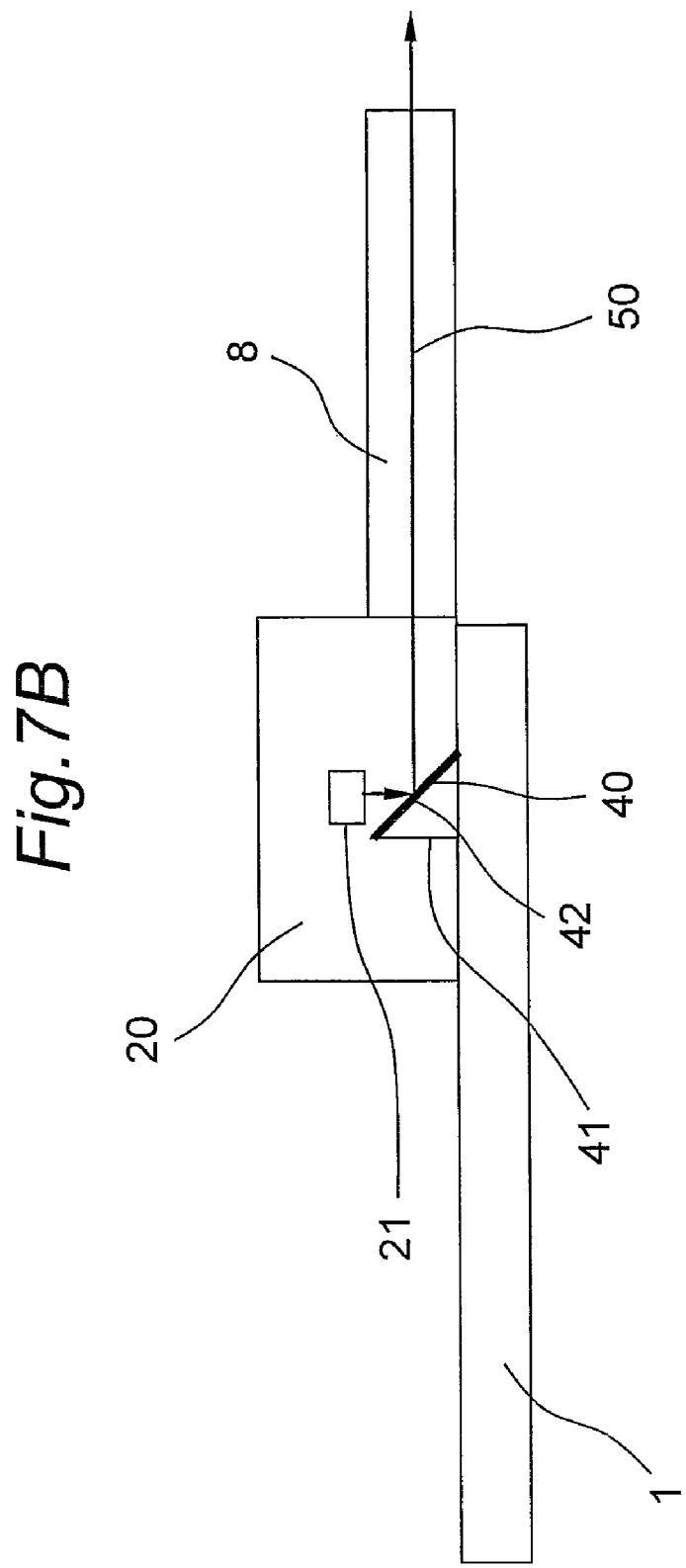

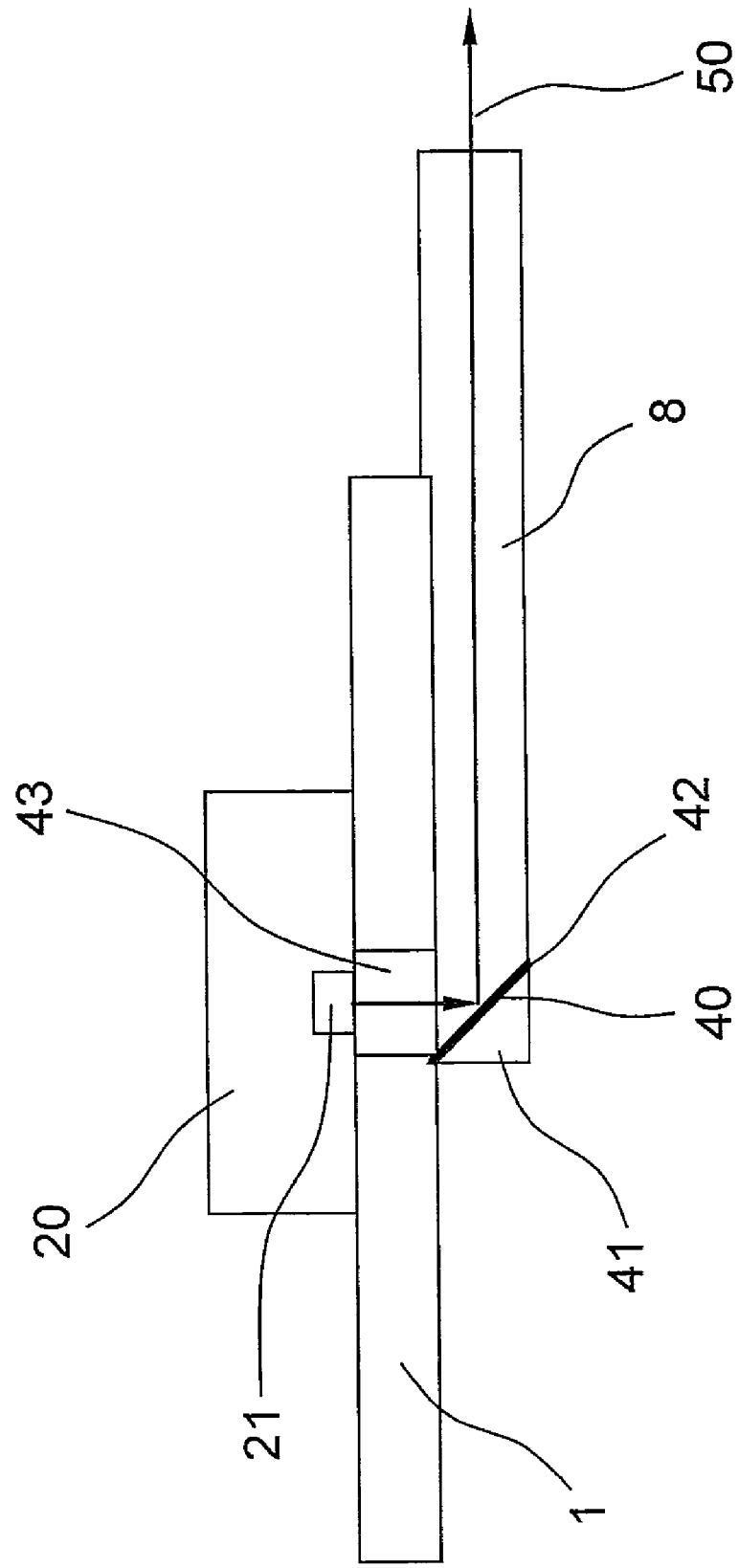

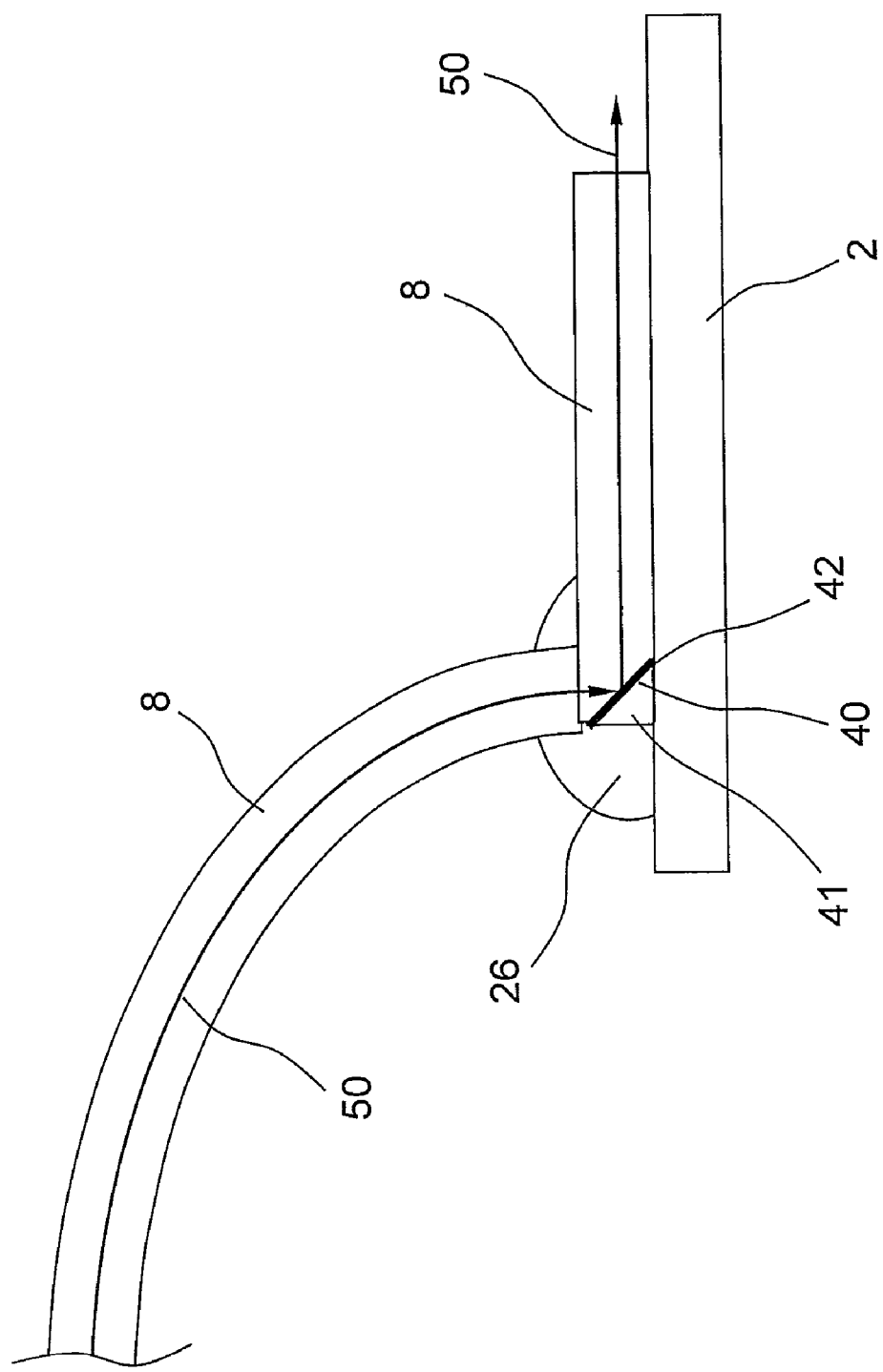

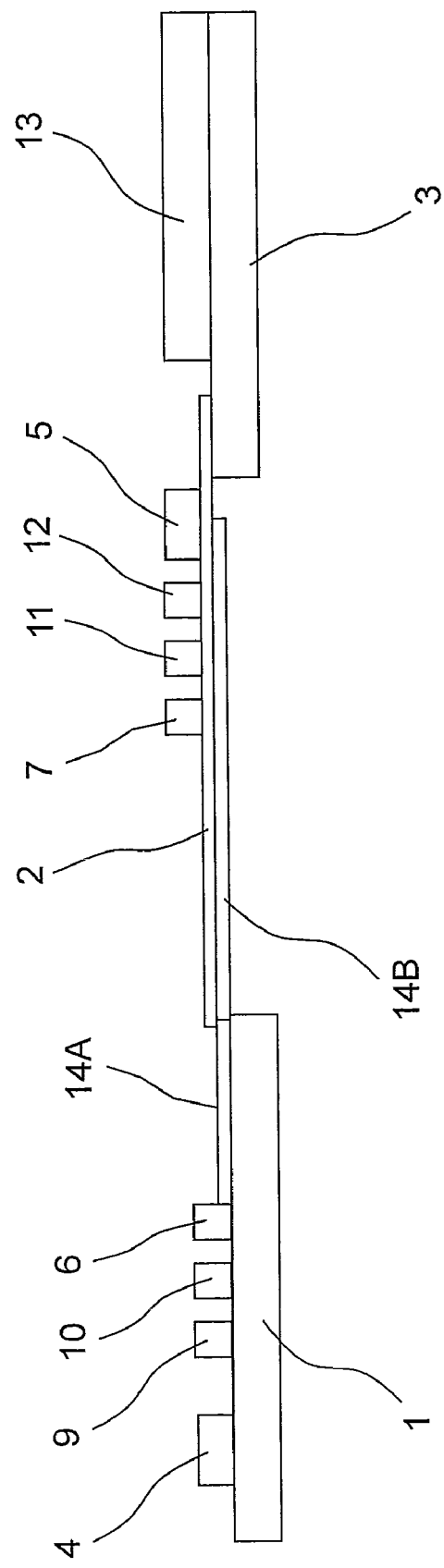

TRANSMISSION SYSTEM FOR IMAGE DISPLAY DEVICE AND ELECTRONIC EQUIPMENT

BACKGROUND OF THE INVENTION

1. Field of the Invention

This invention relates to a transmission system for an image display device, and electronic equipment. In more detail, it relates to a transmission system for an image display device, which transmits a signal between an image display driver IC and an image processing IC, and electronic equipment using the same.

2. Description of the Related Art

Electronic equipment using a conventional transmission system for an image display device will be described below in connection with a liquid crystal display device, which is one of the most common image display devices.

An active matrix type liquid crystal display device has an image display part in which a plurality of pixels are arrayed in a matrix shape. This image display part has two boards and a liquid crystal sealed between the boards. In order to generate an electric field in the liquid crystal at the pixels, pixel electrodes corresponding to the respective pixels are formed on one board, and counter electrodes are formed on the other board so that each counter electrode faces an associated pixel electrode.

In the above liquid crystal display device, the board having the pixel electrodes are provided with a plurality of scanning signal lines and data signal lines for driving the pixels such that they intersect each other. The intersecting portions are each formed with a liquid crystal driving device formed of a thin film transistor (TFT) having a switching function of the pixel electrode.

In the pixels of the liquid crystal display device, an image is formed based on an image signal inputted from an image processing IC (Integrated Circuit). Scanning signals applied to the scanning signal lines and data signals applied to the data signal lines are generated from the image signal. Liquid crystals of the respective pixels are controlled by the ON/OFF control of the transistors by the scanning lines and the data signals, whereby the image is displayed on the image display part.

The liquid crystal display device is provided with a scanning driver IC for driving the scanning signal lines, and a data driver IC for driving the data signal lines. These driver ICs are referred to as image display driver ICs. As a method for connecting an image display driver IC to a liquid crystal display part, the TAB (Tape Automated Bonding) method and the COG (Chip On Glass) method are known (for example, JP2008-241748 A (Patent Document 1)).

In the TAB method, a TCP (Tape Carrier Package) is used in which, for example, as shown in FIG. 24, a data driver IC 102 is bonded to a flexible printed-wiring board (flexble PWB) 101. The TCP is electrically connected to a connection portion provided at a periphery of a glass board 105 formed with a liquid crystal display part 104 by an ACF (Anisotropic Conductive Film). A scanning driver IC 103 is also electrically connected in the same manner.

In the COG method, as shown in FIG. 25, a data driver IC 102 is directly mounted on a glass board 105 at a periphery thereof. The data driver IC 102 is electrically connected to data signal lines by the ACF. A scanning driver IC 103 is also electrically connected to scanning signal lines in the same manner. In FIG. 25, the same component parts as those shown in FIG. 24 are designated by the same reference numerals.

Recently, in the field of image display devices, development of multicolor and high resolution has been advanced, signals transmitted between the image processing IC and the image display driver IC have a high frequency, and the number of bits of inputted data tends to increase. Therefore, in the flexible PWB in which a high-speed signal is transmitted between the image processing IC and the image display driver IC, and which has a bent structure when it is used, an influence of an impedance mismatch becomes particularly conspicuous, and there are problems that an electromagnetic noise is radiated to other equipment (EMI), and such equipment picks up a noise component (EMS). These become a major problem in realization of high resolution.

SUMMARY OF INVENTION

Technical Problem

An object of this invention is to provide a transmission system for an image display device, which can reduce the EMI (Electro Magnet Interface) and/or EMS (Electro-magnetic Susceptibility) noise in transmission between the image display processing IC and the image display driver IC, and realize a high definition, multicolor image to be displayed.

Solution to Problem

In order to solve the above problem, a transmission system for an image display device according to an aspect of the present invention includes:

a first circuit board and a second circuit board;

a flexible member for connecting the first circuit board and the second circuit board to each other;

an image display driver IC mounted on the first circuit board or the flexible member;

an image processing IC mounted on the second circuit board; and an optical transmission path for transmitting in the form of an optical signal at least part of signals to be transmitted between the image display driver IC and the image processing IC.

With the above construction, because transmission in the transmission path between the image display driver IC and the image processing IC, which is most susceptible to an impedance mismatch, is performed by the optical signal, an EMI or EMS noise in the transmission between the image processing IC and the image display driver IC can be reduced, and a high definition, multicolor image to be displayed is achievable.

In one embodiment, at least part of the optical signal transmitted between the image display driver IC and the image processing IC is multiplexed.

In this embodiment, the number of light-emitting devices, light-receiving devices, and optical transmission paths can be reduced. Therefore, it is possible to achieve an inexpensive system.

In one embodiment, the transmission system includes an electrical connection part and an optical connection part for performing, respectively, an electrical connection and an optical connection between the first circuit board and the second circuit board. The electrical connection part and the optical connection part may be composed of different connection components.

In this embodiment, it is possible to select suitable or optimal connection components as the connection parts respectively for connecting an electrical signal and an optical signal.

Alternatively, the electrical connection part and the optical connection part may be composed of a common connection component.

Since connection of the first circuit board to the second circuit board using the common connection component is performed by one-time operation, convenience is improved, and the number of components is also reduced, resulting in an inexpensive construction.

In one embodiment, at least part of the optical transmission path comprises an optical waveguide.

In this embodiment, it is possible to form the optical transmission path integrally with a flexible PWB serving as the flexible member for connecting the first circuit board to the second circuit board, so that convenience and laying properties are improved.

In one embodiment, at least part of the optical transmission path comprises an optical fiber.

In this embodiment, highly reliable and inexpensive wiring can be realized.

In one embodiment, at least part of the optical transmission path comprises an optical waveguide and an optical fiber.

In this embodiment, the optical waveguide integrally formed on a flexible PWB serving as the flexible member is usable in at least part of the optical transmission path, and the optical fiber is usable in a portion connecting the optical waveguide to the board. Thus, convenience and laying properties are improved.

In one embodiment, at least part of the optical transmission path comprises space transmission.

In this embodiment, an inexpensive transmission system for an image display device can be realized.

In one embodiment, at least part of the optical transmission path comprises part of the first circuit board.

In this embodiment, if the image display driver IC is mounted on the first circuit board by the COG method, use of a glass board having a relatively high light transmittance as the first circuit board allows an optical signal to be transmitted through the board, whereby a transmission path with no bend can be realized, and signal degradation can be suppressed.

Electronic equipment according to an aspect of the present invention includes the transmission system according to any one of the above embodiments.

With this construction, it is possible to realize high definition and multicolor of an image to be displayed.

Advantageous Effects of Invention

As is apparent from the above, according to the present invention, the transmission system and electronic equipment can be constructed such that the problem of EMI or EMS noise is avoided with a simple construction, and it is possible to realize a high definition, multicolor image to be displayed.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 1 is a partially broken plan view schematically showing the construction of a transmission system for an image display device of a first embodiment of this invention, in which an image display driver IC is connected to a display panel by the TAB method;

FIG. 2 is a view schematically showing the construction of a transmission system for an image display device in which an image display driver IC is connected to a display panel by the optical TAB method;

FIG. 7A is a view schematically showing the structure of an optical connection part in which an optical axis of light emitted from a light-emitting portion of an EO package is in a normal direction to a circuit board;

FIG. 7B is a view schematically showing another structure of the optical connection part in which the optical axis of light emitted from the light-emitting portion of the EO package is in a normal direction to the circuit board;

FIG. 7C is a view schematically showing another structure of the optical connection part in which the optical axis of light emitted from the light-emitting portion of the EO package is in a normal direction to the circuit board;

FIG. 12 is a view schematically showing the structure of the transmission system for an image display device in which optical axes do not coincide in an optical connection part;

FIG. 13 is a view schematically showing an optical TAB type transmission system for an image display device of a third embodiment of this invention;

DETAILED DESCRIPTION OF THE INVENTION

Figure 3A:
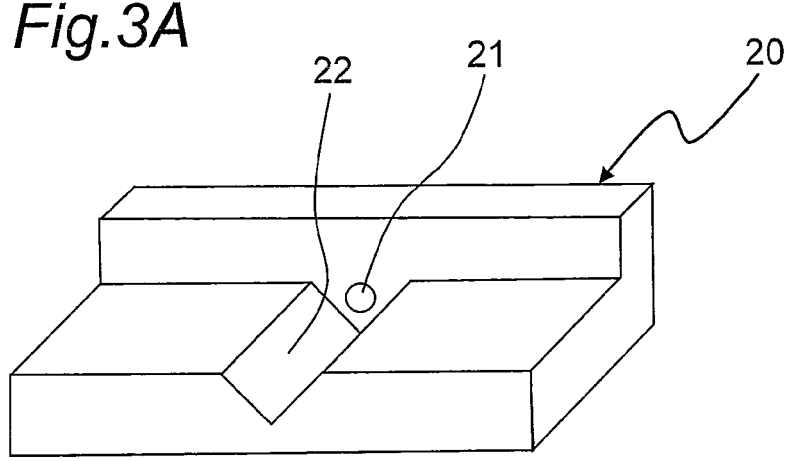
FIG. 3A is a view showing the structure of an EO package in which a light-emitting device is packaged.

Hereinafter, embodiments of a transmission system for an image display device of this invention will be described with reference to the attached drawings. In FIGS. 1-23, component parts having the same function are denoted by the same numerals for the sake simplification of the description. The image display device described in the embodiments is an active matrix type liquid crystal display device.

First Embodiment

FIG. 1 shows the construction of a transmission system for an image display device of a first embodiment, in which an image display driver IC 5 is connected to a glass board 3 as one example of the first circuit board fitted to a display panel 13 by the TAB method. The display panel 13 includes a board and a liquid crystal layer sealed between this board and the glass board 3. Although not shown in the drawings, the glass board 3 has scanning signal lines (or data signal lines), and the display panel 13 has data signal lines (or scanning signal lines) that extend in a direction intersecting a direction in which the scanning signal lines (or the data signal lines) of the glass board 3 extend. Also, switching devices are connected between respective ones of these signal lines and associated pixel electrodes (not shown) in a matrix arrangement. Because the present invention does not reside in the structure and arrangement of component parts of the image display device per se, such as the scanning signal lines, data signal lines, pixel electrodes and switching devices, and it is believed that the structure and arrangement of such component parts of the image display device per se can be easily understood by those skilled in the art, the detailed description thereof is omitted. The above description is applied to the other embodiments.

As shown in FIG. 1, an image signal for displaying an image and a control signal are generated by an image processing IC (Integrated Circuit) 4 mounted on a circuit board 1 as one example of the second circuit board. Of these signals, a signal to be converted to light is multiplexed by a serializer IC (hereinafter referred to as "SER") 9 and converted to a signal for driving a light-emitting device 6 by a driving IC 10. An optical signal emitted by the light-emitting device 6 propagates along an optical transmission path 8 provided at the circuit board 1, then via an optical connection part CN2, propagates along the optical transmission path 8 provided at the flexible PWB 2 as one example of the flexible member, and then is received, through an optical connection part CN3, by a light-receiving device 7. The signal that has become an electrical signal in the light-receiving device 7 is amplified by an amplifier IC 11, and deserialized by a deserializer IC (hereinafter referred to as "DES") 12 to a data format that can be processed by the image display driver IC 5. A signal not to be converted to light signal and a power source are transmitted through the flexible PWB and inputted to the image display driver IC 5. Upon receiving the signal, the image display driver IC 5 drives thin film transistors (not shown) as one example of the switching devices through the scanning signal lines and the data signal lines provided at the glass board 3 and the display panel 13. In addition, although not shown, the flexible PWB 2 has a board having flexibility, and a wiring pattern provided on the board. As the flexible PWB 2, any flexible PWBs that have known structure, such as those in which the wiring pattern is provided only on one surface of the board, those in which the wiring pattern is provided on both surfaces of the board, or those having a multilayer wiring pattern, can be used as necessary.

The circuit board 1 and the flexible PWB 2 are electrically and optically connected by an electrical connection part CN1 and the optical connection part CN2. The flexible PWB 2 and the glass board 3 as one example of the first circuit board are electrically connected using ACF of the like. In addition, the circuit board 1 and the glass board 3 are also mechanically connected through the flexible PWB 2.

As the light-emitting device 6, a laser diode and an LED such as a Fabry-Perot laser diode, a VCSEL (Vertical Cavity Surface Emitting Laser), and a RC-LED (Resonant Cavity Light Emitting Diode) may be used.

In the light-receiving device 7, a PIN-PD (photodiode) composed of Si or a PD composed of a compound such as GaAs may be used. As the amplifier IC 11, a transimpedance amplifier and a limiting amplifier may be used as necessary.

As the optical transmission path 8, an optical fiber and/or an optical waveguide is used. If these are used integrally with a board, a fiber wiring board in which optical fibers are laid on a substrate and an organic optical waveguide fabricated by a process suitable for fabrication of a board are useful.

As the optical fiber, an optical fiber made of silica, a plastic optical fiber, and a plastic clad fiber can be used. As the optical waveguide, a silica-based waveguide is given as an inorganic waveguide, and a waveguide made of epoxy, acrylic, polyimide, norbornene, or the like can be used as an organic waveguide.

In the optical signal transmission, an optical coupling loss in the light-emitting portion, the optical transmission path, and the light-receiving portion greatly affects signal attenuation. Therefore, in the image display device in which a reduced thickness is desired, the structure with high alignment accuracy in optical components is desired while realizing a low height.

FIG. 2 shows the construction of a transmission system for an image display device, in which the image display driver is connected to the glass board 3 by the optical TAB method. This transmission system has a structure in which the optical transmission path 8 is provided as aerial wiring, with the optical connection part CN2 between the light-emitting device 6 and the optical transmission path 8, and with the optical connection part CN3 between the light-receiving device 7 and the light transmission path 8.

Next, an alignment structure in the optical connection part CN2 between the light-emitting device 6 and the optical transmission path 8 will hereinafter be described.

Figure 3B:
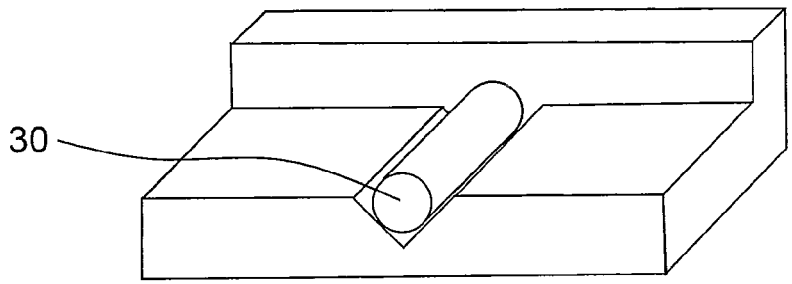
FIG. 3B is a view showing the structure in which an optical fiber is used as an optical transmission path in the EO package.
Figure 3C:
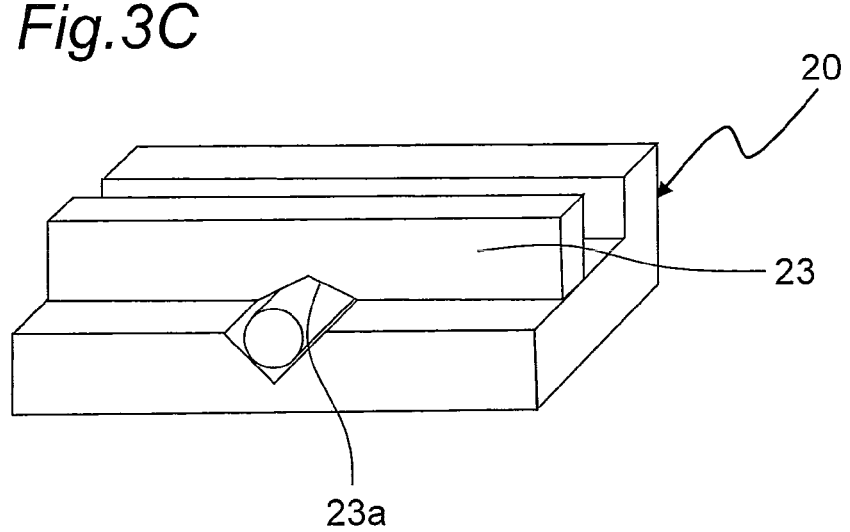
FIG. 3C is a view showing the structure of an optical connection part that connects the EO package and the optical fiber.

FIGS. 3A-3C show the structure of an optical connection part which connects an EO (electro-optic) package 20 in which the light-emitting device 6 is packaged to an optical fiber 30 as the optical transmission path.

As shown in FIG. 3A, the EO package 20 is provided with an optical fiber aligning V groove 22 along an optical axis of light emitted from a light-emitting portion 21. As shown in FIG. 3B, the optical fiber 30 is placed in the V groove 22 along its length so that alignment of the optical axis of the light-emitting portion with an optical axis of the optical fiber 30 is performed. Then, as shown in FIG. 3C, a holddown jig 23 for pressing, from above, the optical fiber 30 disposed in the V groove 22 is put on the EO package. This holddown jig 23 is provided with a V groove 23a at a position opposite to the optical fiber 30.

In this manner, the EO package 20 is provided with the optical fiber aligning V groove 22, and the V groove 23a corresponding thereto is provided in the holddown jig 23, whereby the optical axis of the light-emitting portion 21 is aligned with the optical axis of the optical fiber 30. The same optical axes alignment structure is also applicable to the light-receiving device. The V groove of the EO package 20 and the V groove of the holddown jig 23 hold the optical fiber 30 tight therebetween, and the EO package 20, the holddown jig 23 and the optical fiber 30 are bonded together with a resin. Preferably, this resin should have a transmittance as high as possible in a wavelength region of an optical signal. In addition, considering alignment of the optical components, a photocurable resin having a small curing shrinkage ratio is preferred.

Figure 4A:
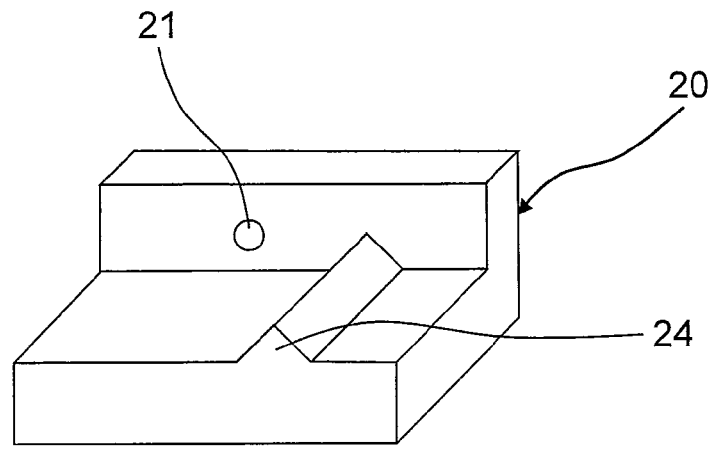
FIG. 4A is a view showing the structure of an EO package.
Figure 4B:
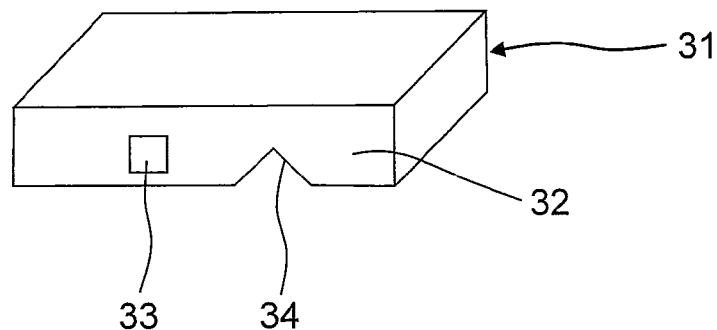
FIG. 4B is a view showing the structure of an optical waveguide used for the optical transmission path.
Figure 4C:
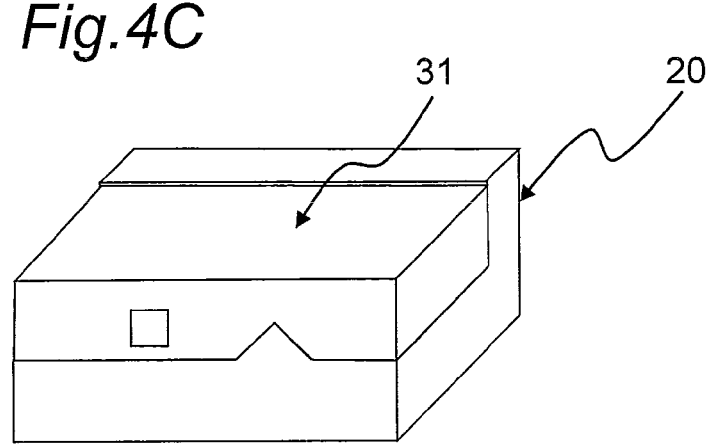
FIG. 4C is a view showing the structure of an optical connection part that connects the EO package and the optical waveguide.

FIGS. 4A-4C show the structure of an optical connection part in which the EO package 20 is connected to an optical waveguide 31 as the optical transmission path.

As shown in FIG. 4A, the EO package 20 has a ridge-like fitting projection 24 having a triangular shape in cross section, parallel to the optical axis of light emitted from the light-emitting portion 21, at a predetermined interval therefrom. As shown in FIG. 4B, a fitting groove 34 having a triangular shape in cross section is provided in a cladding portion 32 of the optical waveguide 31 at a position opposite to the fitting projection 24. This optical waveguide 31 is provided with a core portion 33 having a rectangular shape in cross section parallel to the fitting groove 34 at a predetermined interval therefrom. As shown in FIG. 4C, the optical waveguide 31 is disposed on the EO package 20 so that the fitting projection 24 of the EO package 20 is fitted into the fitting groove 34 of the optical waveguide 31.

In this manner, alignment is performed by the fitting projection 24 and the fitting groove 34 of the EO package 20 and the optical waveguide 31, respectively, and the EO package 20 and the optical waveguide 31 are bonded together with a resin. If the fitting groove 34, which is provided in the optical waveguide 31, is directly fabricated in the cladding portion 32, the number of components is reduced, thus making it possible to realize a low-height structure.

Figure 5A:
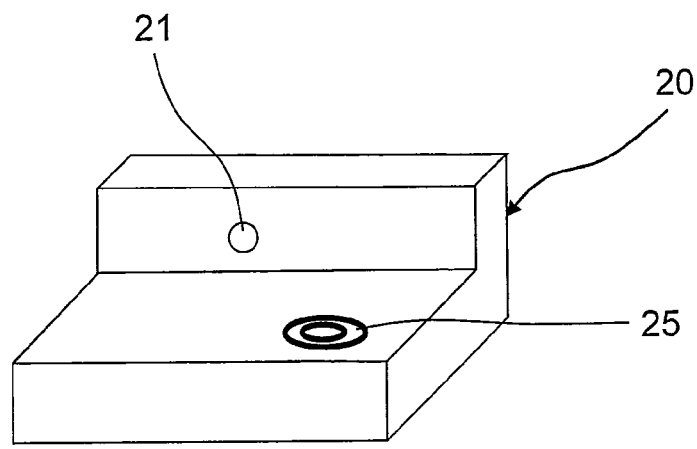
FIG. 5A is a view showing the structure of an EO package.
Figure 5B:
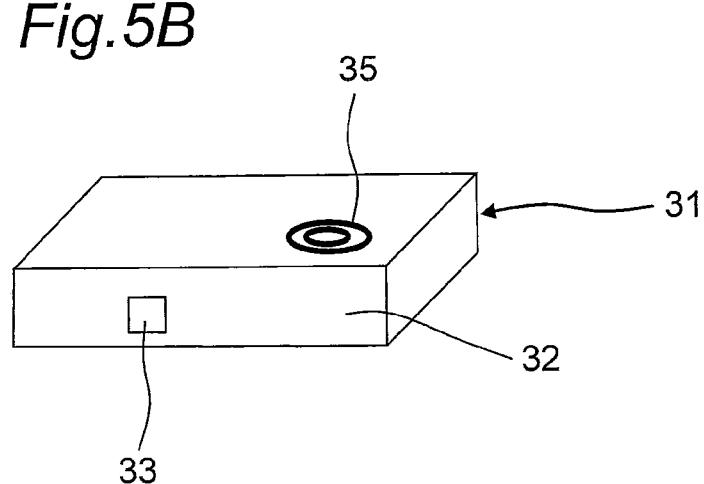
FIG. 5B is a view showing the structure of an optical waveguide used for the optical transmission path.
Figure 5C:
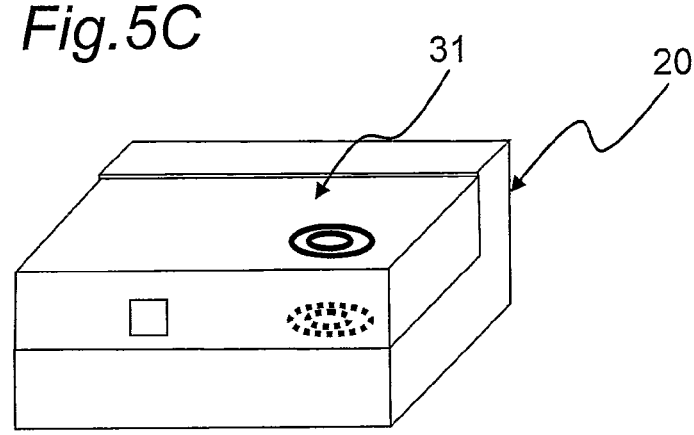
FIG. 5C is a view showing the structure of an optical connection part that connects the EO package and the optical waveguide.

FIGS. 5A-5C show the structure of an optical connection part in which the EO package 20 is connected to the optical waveguide 31.

As shown in FIG. 5A, the EO package 20 is provided with a mark 25 at a predetermined interval from the optical axis of light to be emitted from the light-emitting portion 21. As shown in FIG. 5B, a mark 35 is provided on the cladding portion 32 of the optical waveguide 31 at a position opposite to the mark 25. This optical waveguide 31 is provided with a core portion 33 having a rectangular shape in cross section. As shown in FIG. 5C, the optical waveguide 31 is disposed on the EO package 20 so that the mark 25 of the EO package 20 is aligned with the mark 35 of the optical waveguide 31.

In this manner, alignment is performed by the alignment marks 25, 26 provided on the EO package 20 and the optical waveguide 31, respectively, and the EO package and the optical waveguide 31 are bonded and fixed together with a resin. The alignment mark 35 of the optical waveguide 31 may be fabricated in a core layer in the same process as the fabrication of the core portion 33. In such a case, variations of the position of the mark 35 relative to the core portion 33 would be restrained. This structure can realize a particularly high precision if it is used in combination with active alignment. Therefore, it is suited for the structure requiring extremely high precision such as an optical coupling structure of a single mode.

Figure 6A:
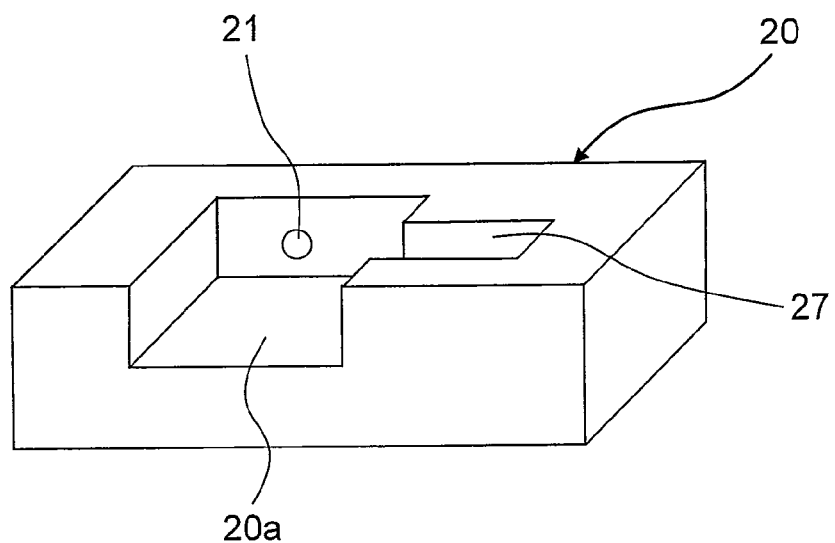
FIG. 6A is a view showing the structure of an EO package.
Figure 6B:
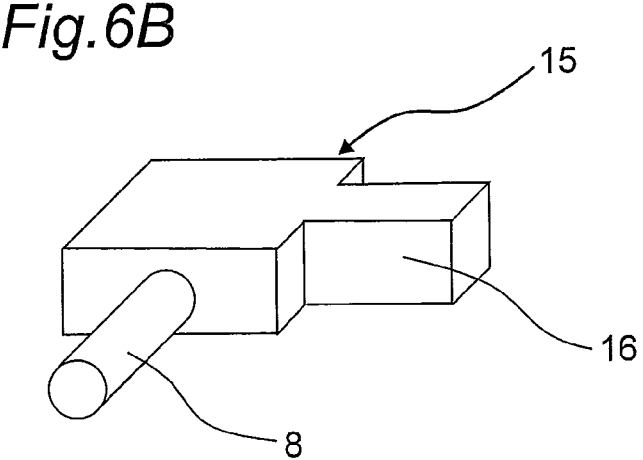
FIG. 6B is a view showing the structure of a connector connected to the EO package.
Figure 6C:
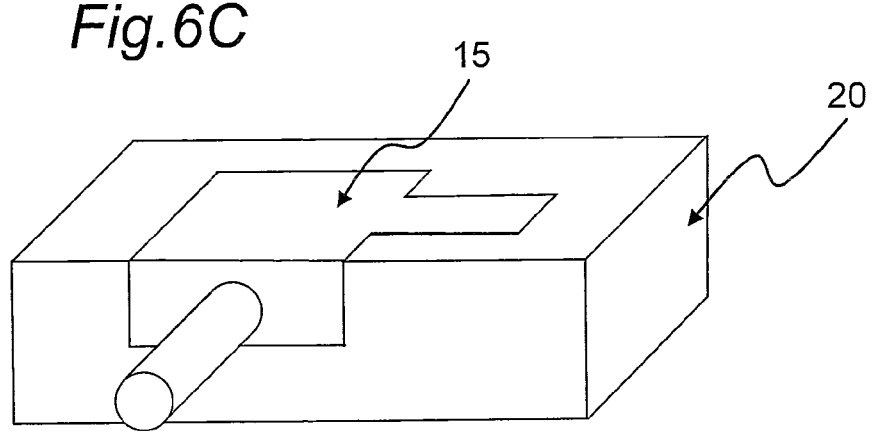
FIG. 6C is a view showing the structure of an optical connection part in which the connector is connected to the EO package.

FIGS. 6A-6C show the structure of an optical connection part in which the EO package 20 is connected to a connector 15.

As shown in FIG. 6A, the EO package 20 having a light-emitting portion 21 has a receiving portion 20a from which a fitting recess 27 extends in a direction perpendicular to the optical axis of the light-emitting portion 21. As shown in FIG. 6B, an optical transmission path 8 is connected to the connector 15. This connector 15 has a fitting projection 16 which extends from a connector body in a direction perpendicular to an optical axis direction of the optical transmission path 8. As shown in FIG. 6C, the connector 15 is received in the EO package so that the fitting projection 16 of the connector 15 is fitted into the fitting recess 27 of the EO package 20.

In this manner, the fitting projection 16 and the fitting recess 27 are used for alignment of the connector and the EO package 20. By providing the fitting projection 16 and fitting recess 27 in a direction along a plane parallel to the board like this, an optical coupling structure with a low height can be realized. In this optical coupling structure, both the optical fiber and the optical waveguide can be used for the optical transmission path 8.

Further, since the connector is used, the structure shown in FIGS. 6A-6C can also have an electrical connection part for a power source and a control signal in addition to the optical connection part. In this case, since connection of the first circuit board to the second circuit board using a common connection component is performed by one-time operation, convenience is improved, and the number of components is also reduced, resulting in an inexpensive construction.

FIGS. 7A-7C show the structure of a transmission system for an image display device in which the optical axis of light emitted from the light-emitting portion 21 of the EO package 20 is in a normal direction with respect to the circuit board 1.

In the transmission system for an image display device shown in FIG. 7A, the EO package 20 is placed on the circuit board 1 so that the optical axis of light emitted from the light-emitting portion 21 is in a direction perpendicular to a surface of the circuit board 1. A reflection mirror 40 is disposed for optical path conversion on the upper side of the light-emitting portion 21 of the EO package 20, and a direction of light emitted from the light-emitting portion 21 is converted so that the light is emitted in a direction parallel to the circuit board 1 surface. Then, an optical signal 50 whose optical path has been converted is transmitted through the optical transmission path 8.

In the transmission system for an image display device shown in FIG. 7B, the EO package 20 is placed on the circuit board 1 so that light is emitted from the light-emitting portion 21 in the EO package 20 in a direction perpendicular to the circuit board 1 surface and toward the circuit board 1. The reflection mirror 40 is disposed for optical path conversion on the lower side of the light-emitting portion 21 of the EO package 20 and on the circuit board 1 so that the direction of light emitted from the light-emitting portion 21 is converted to a direction parallel to the circuit board 1 surface. An optical signal 50 whose optical path has been converted is transmitted through the optical transmission path 8.

In the transmission system for an image display device shown in FIG. 7C, the EO package 20 is placed on the circuit board 1 so that light is emitted in a direction perpendicular to the circuit board 1 surface and toward the circuit board 1 from the light-emitting portion 21 on the lower side of the EO package 20. A portion of the circuit board 1 on the lower side of the light-emitting portion 21 of the EO package 20 is formed with an optical Via 43. The reflection mirror 40 is disposed for optical path conversion on the back side of the circuit board 1 at a position opposite to the optical Via 43 so that the direction of light emitted from the light-emitting portion 21 is converted to a direction parallel to the circuit board 1 surface. The optical signal 50 whose optical path has been converted is transmitted through the optical transmission path 8.

In this manner, in FIGS. 7A-7C, the reflection mirror 40 is used for optical path conversion in the connection part of the optical transmission path 8. The reflection mirror 40 can be formed in a mirror shape directly at the transmission path by dicing, molding, polishing, or laser processing. At this time, since the efficiency depends on a difference in refractive index at an interface, it is desired to form an interface using a reflection member 41 having a sufficiently smaller refractive index than a refractive index of the transmission path. In the case where the sufficient difference in refractive index is not obtained with the reflection member 41, a metal film 42 such as Au and Ag may be placed at the mirror interface to realize a reflection mechanism by metal reflection.

In addition, as shown in FIG. 7C, if the optical transmission path 8 is formed on the side opposite from the EO package 20, the board 1 is formed with the optical Via 43. This optical Via 43 can be formed by providing a through hole in the circuit board using a laser or a drill, and filling a light-transmissive resin in the through hole. If the Via 43 is to be formed in the flexible PWB 2, a Cu layer of the flexible PWB may be removed by etching so that the optical Via 43 with the structure in which light is transmitted through a PI (polyimide) layer is obtained.

The transmission systems for an image display device have been described especially regarding the alignment structure between the light-emitting device 6 and the optical transmission path 8, and the alignment between the light-receiving device 7 and the optical transmission path 8 can be realized with a similar structure.

According to the transmission system for an image display device with the above construction, transmission by an optical signal in the transmission path, which is most susceptible to an impedance mismatch, can reduce an EMI or EMS noise in the transmission between the image processing IC 4 and the image display driver IC 5, so that a high definition, multicolor image to be displayed can be realized.

Further, at least part of the optical signal transmitted between the image processing IC 4 and the image display driver IC 5 is multiplexed by the SER 9, whereby the number of light-emitting devices, light-receiving devices, and optical transmission paths required for optical signal transmission can be reduced. Therefore, it is possible to form an inexpensive system.

Further, when the electrical connection part and the optical connection part are formed of different connection components, it is possible to select connection components optimal for the electrical signal and the optical signal as necessary.

In the first embodiment, by using the optical waveguide as the optical transmission path, it is also possible to form it integrally with the flexible PWB, and convenience and laying properties are improved.

Furthermore, in the first embodiment, by using the optical fiber as the optical transmission path, highly reliable and inexpensive wiring can be realized.

Second Embodiment

Figure 8:
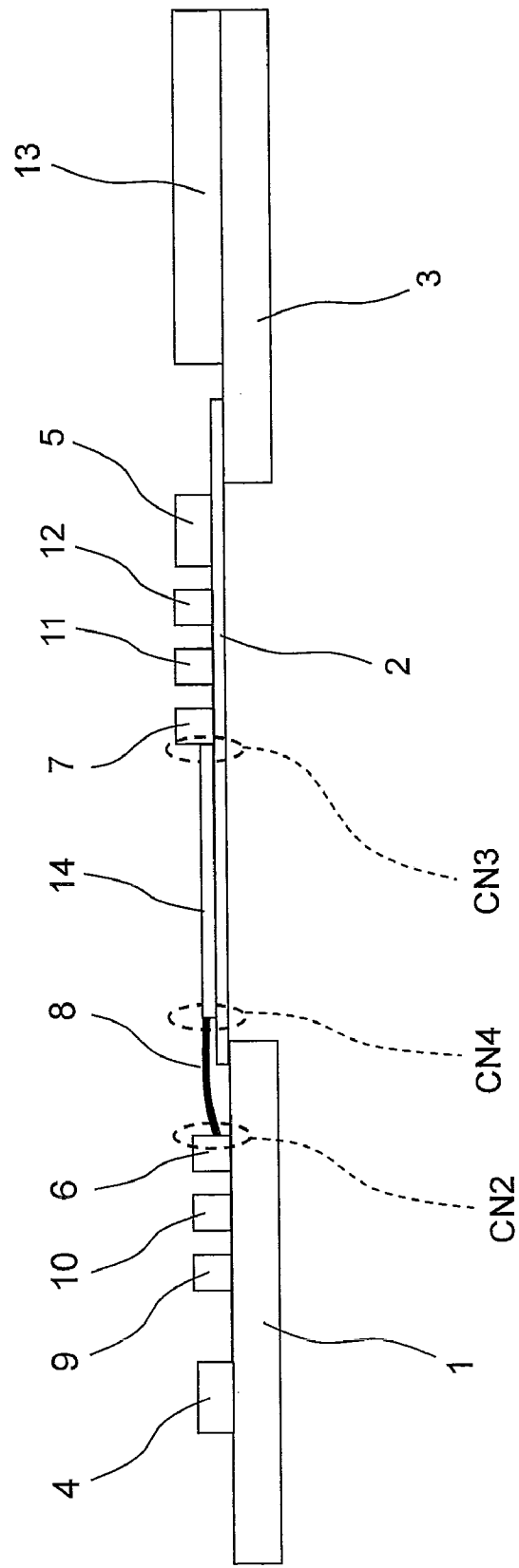
FIG. 8 is a view schematically showing an optical TAB type transmission system for an image display device of a second embodiment of this invention.

FIG. 8 shows an optical TAB transmission system for an image display device of a second embodiment. An optical transmission path is constructed of an optical transmission path 8 that is an aerial wiring and a board integrated type optical transmission path 14 formed integrally with the flexible PWB 2. Optical connection parts are structures required at three places, i.e., between a light-emitting device 6 and the optical transmission path 8, between the optical transmission path 8 and the board integrated type optical transmission path 14, and between the board integrated type optical transmission path 14 and a light-receiving device 7. Any one of the structures shown in FIGS. 3-7 can be applied to an optical connection part CN2 between the light-emitting device 6 and the optical transmission path 8 and an optical connection part CN3 between the board integrated type optical transmission path 14 and the light-receiving device 7.

An optical connection part CN4 between the optical transmission path 8 and the board integrated type optical transmission path 14 will be described below.

Figure 9A:
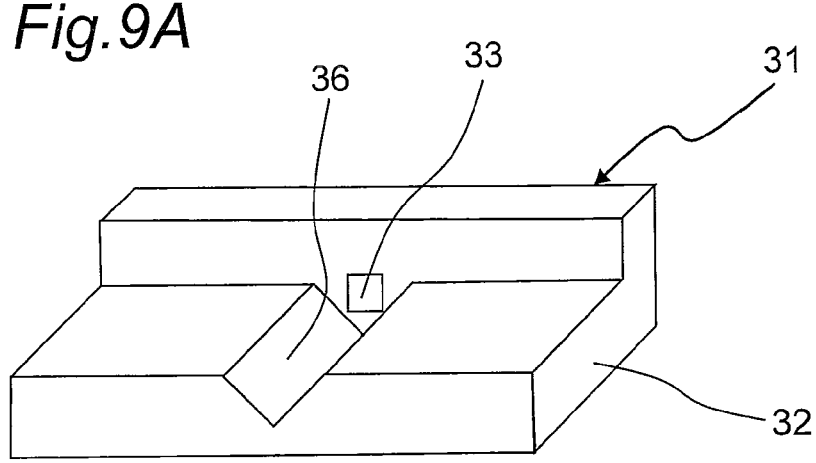
FIG. 9A is a view showing an optical waveguide applied to a board integrated type optical transmission path.
Figure 9B:
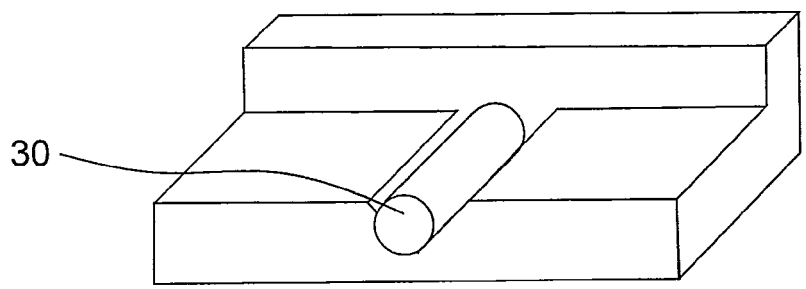
FIG. 9B is a view showing an optical connection part in which an optical fiber is applied to the optical waveguide as the optical transmission path.
Figure 9C:
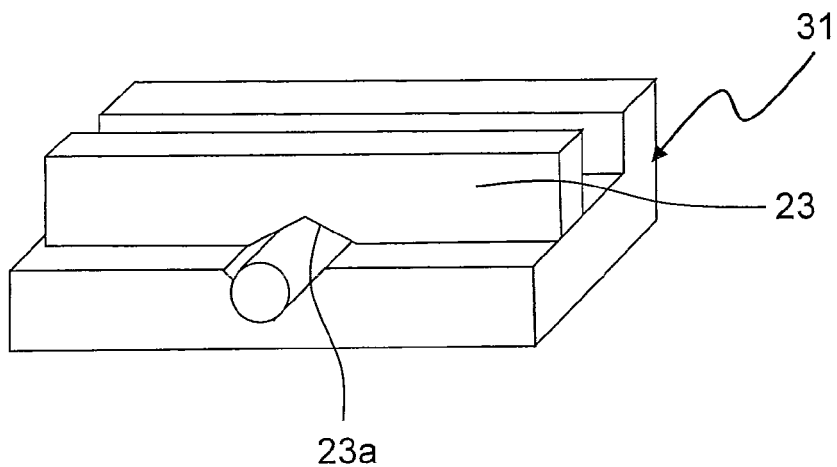
FIG. 9C is a view showing the optical connection part in which a holddown jig is disposed on the optical waveguide in which the optical fiber is disposed.

FIGS. 9A-9C show an optical connection part for a transmission system for an image display device, in which an optical waveguide 31 is applied to the board integrated type optical transmission path 14.

As shown in FIG. 9A, an optical waveguide 31 having a core portion 33 is provided with an aligning V groove 36 along an optical axis of the core portion 33. As shown in FIG. 9B, an optical fiber 30 is disposed in the V groove 36 along its length so that the optical axis of the core portion 33 of the optical waveguide 31 is aligned with an optical axis of the optical fiber 30. Then, as shown in FIG. 9C, a holddown jig 23 for pressing, from above, the optical fiber 30 disposed in the V groove 36 is put on the optical waveguide 31. This holddown jig 23 is provided with a groove 23a at a position opposite to the optical fiber 30.

In this manner, the optical fiber 30 is placed in the aligning V groove 36 provided in the optical waveguide 31, and the optical fiber 30 and the optical waveguide 31 are bonded and fixed together with a resin not shown. Since the alignment is performed by the V groove 36, it is desired that relative positioning accuracy between the core portion 33 and the V groove 36 be high. In the structure shown in FIGS. 9A-9C, the V groove 36 is fabricated by directly processing the cladding portion 32. The processing of the V cladding portion 32 is done using a mold during curing.

Figure 10A:
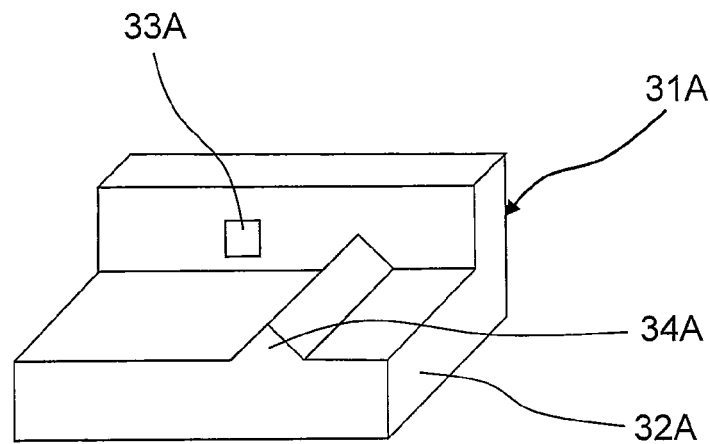
FIG. 10A is a view showing an optical waveguide applied to a board integrated type optical transmission path.
Figure 10B:
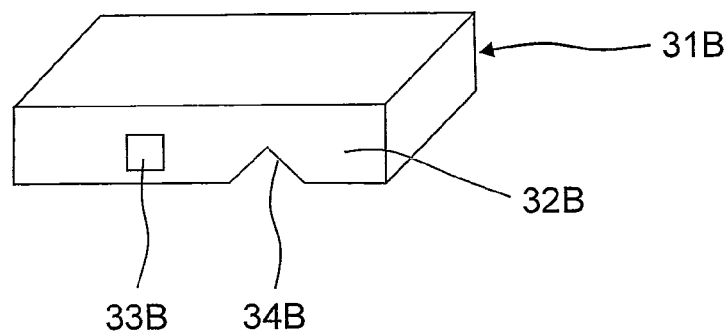
FIG. 10B is a view showing an optical waveguide applied to an optical transmission path.
Figure 10C:
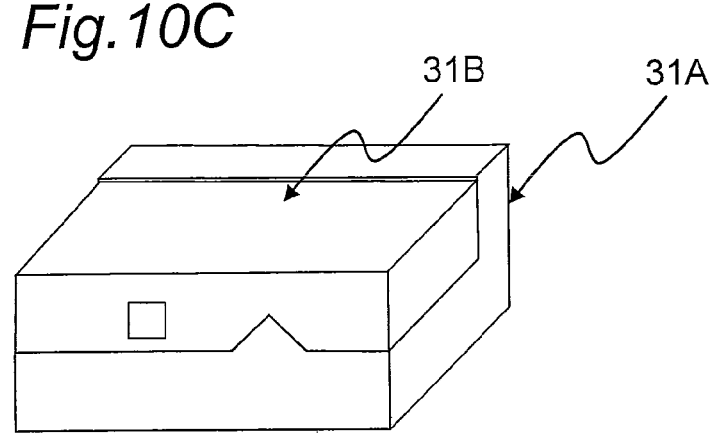
FIG. 10C is a view showing an optical connection part that connects the optical transmission path and the optical waveguide.

FIGS. 10A-10C show an optical connection part for a transmission system for an image display device, in which the optical waveguide 31 is applied to both the optical transmission path 8 and the board integrated type optical transmission path 14.

As shown in FIG. 10A, an optical waveguide 31A having a core portion 33A has a ridge-like fitting projection 34A having a triangular shape in cross section, parallel to an optical axis of the core portion 33A, at a predetermined interval therefrom. As shown in FIG. 10B, a fitting groove 34B having a triangular shape in cross section is provided in a cladding portion 32B of the optical waveguide 31B at a position opposite to the fitting projection 34A. This optical waveguide 31B is provided with a core portion 33B having a rectangular shape in cross section parallel to the fitting groove 34B at a predetermined interval therefrom. As shown in FIG. 10C, the optical waveguide 31B is disposed on the optical waveguide 31A so that the fitting projection 34A of the optical waveguide 31B is fitted into the fitting groove 34B of the optical waveguide 31B.

In this manner, the optical waveguides 31A, 31B are aligned with each other by the fitting projection 34A and the fitting groove 34B, and the optical waveguides 31A, 31B are bonded and fixed together with a resin.

Figure 11A:
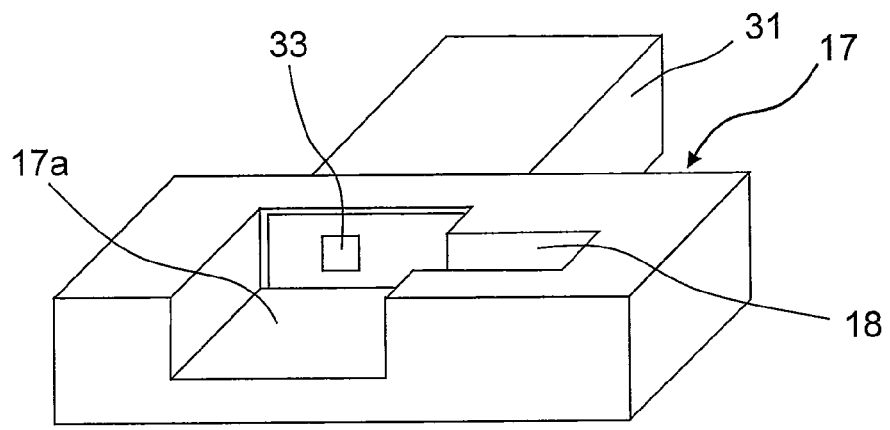
FIG. 11A is a view showing a connector as an optical connection part of a board integrated type optical transmission path.
Figure 11B:
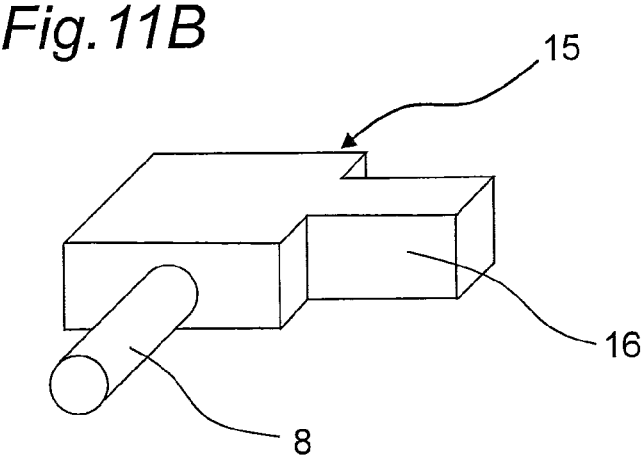
FIG. 11B is a view showing a connector as an optical connection part of an optical transmission path.
Figure 11C:
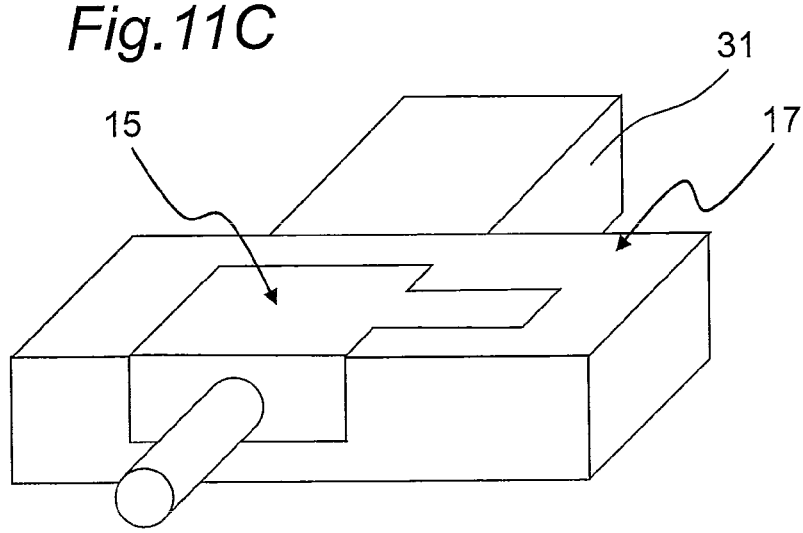
FIG. 11C is a view showing a state in which the connector as the optical connection part of the optical transmission path and the connector as the optical connection part of the board integrated type optical transmission path are combined.

FIGS. 11A-11C shows an optical connection part for a transmission system for an image display device, in which connectors 15 and 17 serving as the optical connection part CN4 between the optical transmission path 8 and the board integrated type optical transmission path 14 are combined.

As shown in FIG. 11A, the connector 17, to which an optical waveguide 31 having a core portion 33 is connected, has a receiving portion 17a from which a fitting recess 18 extends in a direction perpendicular to the optical axis of the core portion 33. As shown in FIG. 11B, the connector 15 is provided with the optical transmission path 8. This connector 15 has a fitting projection 16 which extends from a connector body in a direction perpendicular to an optical axis direction of the optical transmission path 8. As shown in FIG. 11C, the connector is disposed in the receiving portion 17a of the connector 17 so that the fitting projection 16 of the connector 15 is fitted into the fitting recess 18 of connector 17.

The connector 17 of the board integrated type optical transmission path 14 is fixed on the flexible PWB 2. By providing the fitting projection 16 and the fitting recess 18 in a direction along a plane parallel to this board in the same manner as in FIG. 6, a low height structure can be realized. In this structure, since the optical transmission path is integrated with the electrical circuit board, the connectors 15 and 17 each may have both the optical connection part and the electrical connection part. In this case, since connection of the flexible PWB to the second circuit board using common connection components is performed by one-time operation, convenience is improved, and the number of components is also reduced, resulting in an inexpensive construction.

FIG. 12 shows an optical transmission system including the optical transmission path 8 and the board integrated type optical transmission path 14, in which optical axes do not coincide in the optical connection part. As shown in FIG. 12, a reflection member having a right triangle shape in cross section is disposed on the flexible PWB 2, and a reflection mirror 40 is provided on an inclined surface of the reflection member 41. In addition, the optical transmission path 8 is disposed on the flexible PWB 2 and extends from the reflection member 41 along the flexible PWB 2. One end of the optical transmission path 8 is fixed to the reflection member 41 with a resin 26.

In this transmission system for an image display device, the reflection mirror 40 for optical path conversion is provided to convert the optical axis of an optical signal 50 and realize an optical coupling.

The transmission system for an image display device of the second embodiment has similar effects to those of the transmission system for an image display device of the first embodiment.

In addition, according to the second embodiment, the structure in which the optical waveguide integrally formed on the flexible PWB 2 is used as the optical transmission path, and an optical fiber is used for a portion connecting the flexible PWB 2 and the board is enabled, and convenience and laying properties are improved.

Third Embodiment

FIG. 13 shows an optical TAB type transmission system for an image display device of a third embodiment, which system has a structure in which a board integrated type optical transmission path 14 is formed on a circuit board 1 and a flexible PWB 2.

As shown in FIG. 13, an image processing IC 4, a SER 9, a driving IC 10, and a light-emitting device 6 are mounted on the circuit board 1. Further, a light-receiving device 7, an amplifier IC 11, a DES 12, and an image display driver IC 5 are mounted on the flexible PWB 2. An optical signal emitted by the light-emitting device 6 propagates along a board integrated type optical transmission path 14A provided on the circuit board 1, through a board integrated type optical transmission path 14B provided on the flexible PWB 2, and through an optical connection part, and received by the light-receiving device 7. The signal converted to an electrical signal in the light-receiving device 7 is amplified by the amplifier IC 11 and deserialized, by the DES 12, to a data format that can be processed by the image display driver IC 5. A signal to be not converted to light and a power source are transmitted through the flexible PWB 2 and inputted to the image display driver IC 5. Upon receiving the signal, the image display driver IC 5 drives scanning signal lines and data signal lines.

The circuit board 1 and the flexible PWB 2 are electrically and optically connected by the electrical connection part and the optical connection part. The flexible PWB 2 and the glass board 3 are electrically connected using ACF or the like.

In the structure of this transmission system for an image display device, an optical connection part between the board integrated type optical transmission paths 14A, 14B is required. In this embodiment, these optical transmission paths are fixed with their terminal portions aligned with each other. The alignment is performed using a mold or an alignment mark, and, for fixation, bonding by a resin and a fit-fixation structure such as a connector can be used. An optical connection surface perpendicular to the optical axis raises a problem that reflected light becomes a noise. Such an influence of reflected light is suppressed by making the connection surface have an inclined surface structure. The connection surface for suppressing reflected light is desirably inclined by 4° C. or more from the direction perpendicular to the optical axis.

The transmission system for an image display device of the third embodiment has similar effects to those of the transmission system for an image display device of the first embodiment.

Fourth Embodiment

The structure of the transmission system for an image display device shown in FIG. 13 of the third embodiment has a design restriction since the optical connection surface is limited to the terminal portions of the optical transmission paths. Then, in the structure of a transmission system for an image display device of a fourth embodiment, a reflection mirror 40 is used to make it possible to take out light from any position in an optical connection part between the board integrated type optical transmission paths.

Figure 14:
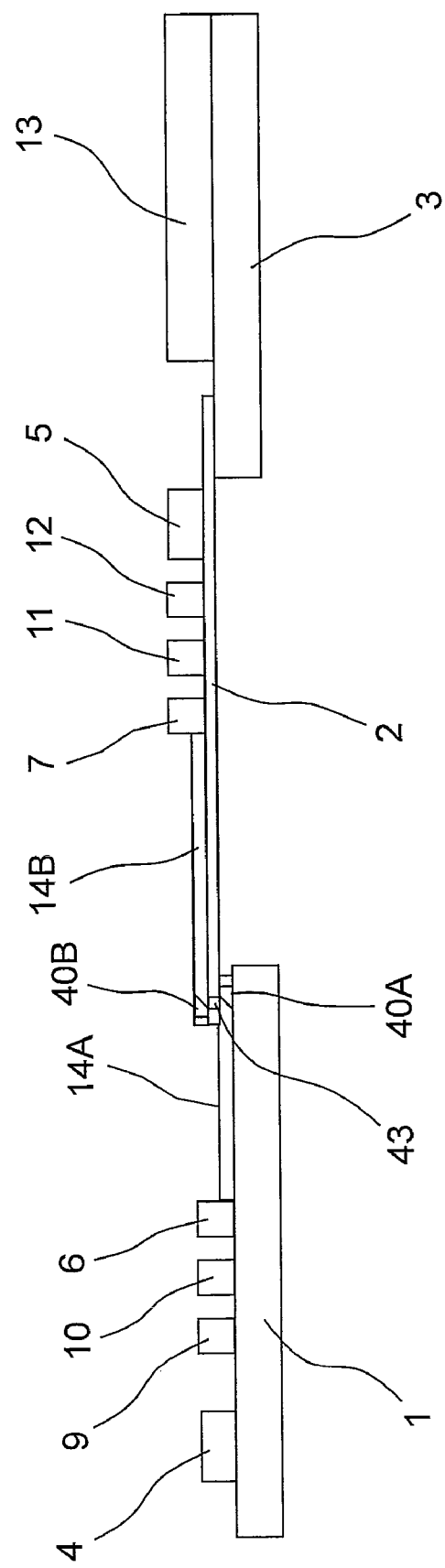
FIG. 14 is a view schematically showing the structure of a transmission system for an image display device of a fourth embodiment of this invention in which a reflection mirror is used in an optical connection part between board integrated type optical transmission paths.

As shown in FIG. 14, a light-emitting device 6 is optically coupled to one end of a board integrated type optical transmission path 14A provided on a circuit board 1. A reflection mirror 40A for reflecting an optical signal from the light-emitting device 6 in an upper direction perpendicular to a surface of the circuit board 1 is disposed at the other end of the board integrated type optical transmission path 14A. Laid on the upper side of the reflection mirror 40A is a part of the flexible PWB 2, and the part of the flexible PWB 2 on the flexible mirror 40A is provided with an optical Via 43. A reflection mirror 40B for reflecting light in a direction along the flexible PWB 2, and a board integrated type optical transmission path 14B extending from the reflection mirror 40B to the light-receiving device 7 are disposed on the optical Via 43 in the flexible PWB 2.

The transmission system for an image display device of the fourth embodiment has similar effects to those of the transmission system for an image display device of the first embodiment.

Fifth Embodiment

Figure 15:
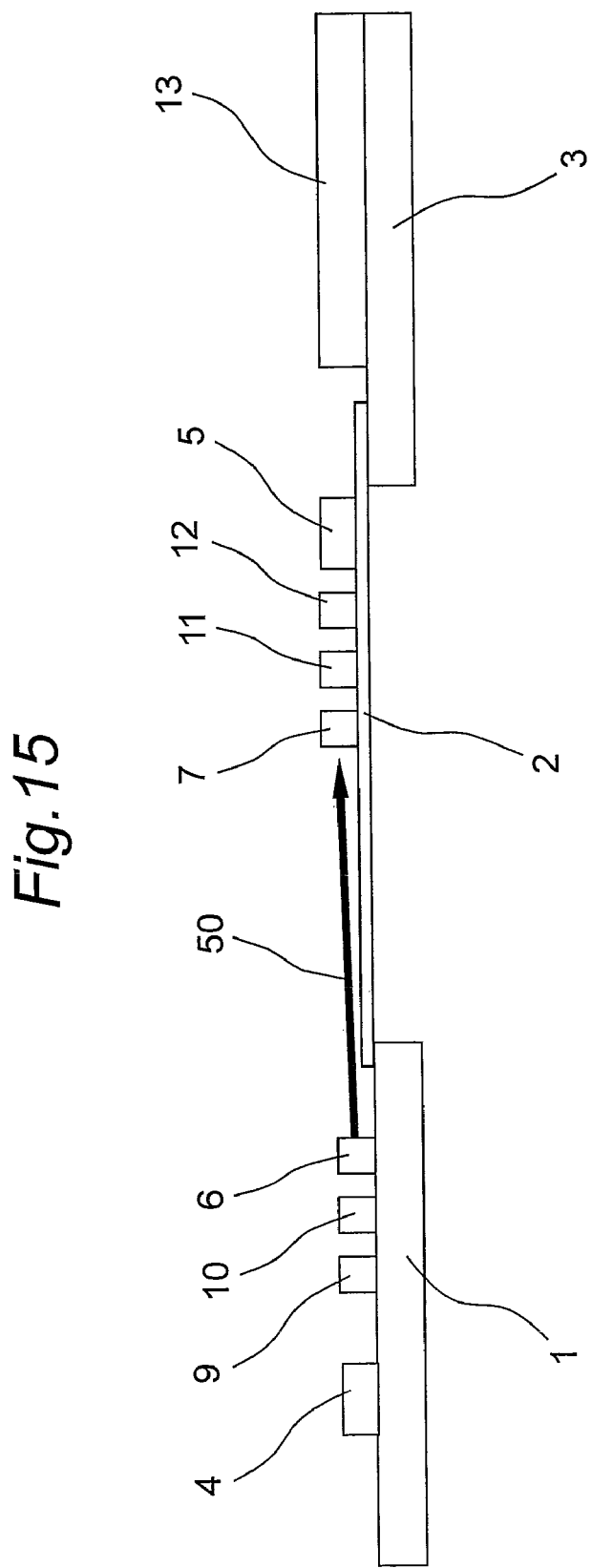
FIG. 15 is a view schematically showing an optical wireless structured transmission system for an image display device of a fifth embodiment of this invention, which has no specific optical transmission path.

A transmission system for an image display device of a fifth embodiment shown in FIG. 15 is a so-called optical wireless structured transmission system for an image display device, which has no specific optical transmission path.

As shown in FIG. 15, an optical signal 50 from a light-emitting device 6 mounted on a circuit board 1 is spatially transmitted without passing through an optical transmission path, and received by a light-receiving device 7.

In the optical wireless structure of the transmission system for an image display device, since it is not required to use a specific optical transmission path, the transmission system is superior in handling, and can be fabricated at a low cost. However, since this system has low optical coupling efficiency, detailed design is required in which required optical coupling efficiency and coupling tolerance are set, and changes due to external factors, such as a light transmittance in a propagating portion, a propagation distance, a light spread angle of the light-emitting device used, temperatures of these components, are considered.

According to the transmission system for an image display device with the above construction, transmission is performed by the optical signal in the transmission path, which is influenced the most by the impedance mismatch, an EMI or EMS noise in the transmission between the image processing IC and the image display driver IC can be reduced, and a high definition, multicolor image to be displayed can be realized.

In the fifth embodiment, space transmission is used in at least part of the optical transmission path, whereby an inexpensive transmission system for an image display device can be realized.

Sixth Embodiment

Figure 16:
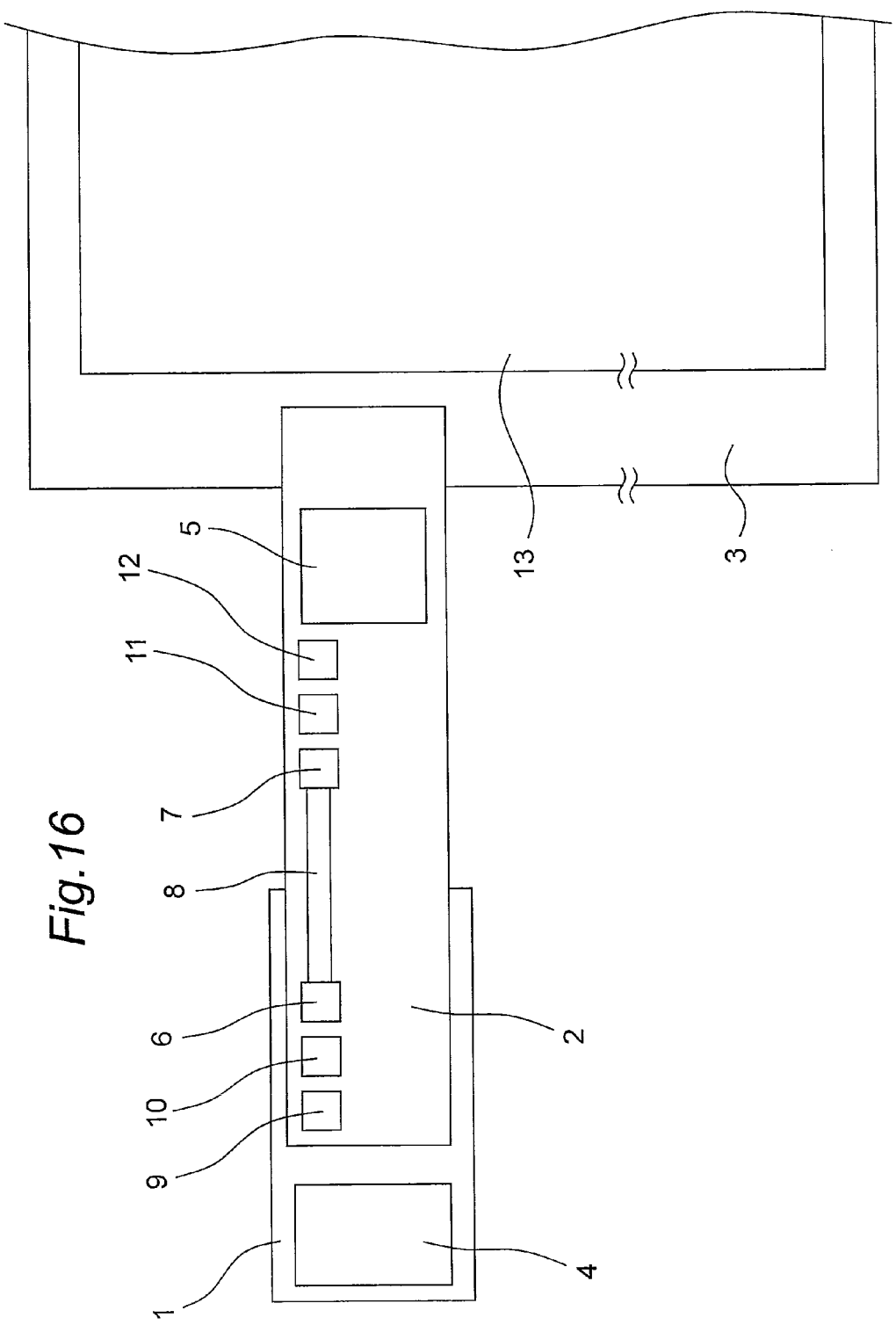
FIG. 16 is a partially broken plan view schematically showing the structure of a transmission system for an image display device of a sixth embodiment of this invention, in which an optical transmission path is limited within a portion of a flexible PWB.

A transmission system for an image display device of a sixth embodiment shown in FIG. 16 has a structure in which an optical transmission path is limited within a portion of a flexible PWB 2.

As shown in FIG. 16, an image processing IC 4 is mounted on a circuit board 1, and one end portion of the flexible PWB 2 is connected to the circuit board 1. A SER 9, a driving IC 10, and a light-emitting device 6 are mounted on one end side of the flexible PWB 2, and a light-receiving device 7, an amplifier IC 11, a DES 12, and an image display driver IC 5 are mounted on the other end side of the flexible PWB 2. An optical signal emitted by the light-emitting device 6 passes through an optical connection part (refer to CN2 of FIG. 1) and propagates along the optical transmission path 8 provided on the flexible PWB 2, and is received, through an optical connection part (refer to CN3 of FIG. 1), by the light-receiving device 7 mounted on the other end of the flexible PWB 2. The signal converted to an electrical signal in the light-receiving device 7 is amplified by the amplifier IC 11, and deserialized, by the DES 12, to a data format that can be processed by the image display driver IC 5. A signal not to be converted to light signal and a power source are transmitted through the flexible PWB 2 and inputted to the image display driver IC 5. Upon receiving the signal, the image display driver IC 5 drives scanning signal lines and data signal lines. The circuit board 1 and the flexible PWB 2 are electrically and optically connected by the electrical connection part and the optical connection part. The flexible PWB 2 and the glass board 3 are electrically connected using ACF or the like.

Conventional designs and structures can be used for the circuit board 1. Further, since the optical transmission path 8 does not extend beyond the flexible PWB 2, it has an advantage that there is no need to provide an optical connection part between the optical transmission paths even if a board integrated type optical transmission path 14 (refer to FIG. 8) is used.

The transmission system for an image display device of the sixth embodiment has similar effects to those of the transmission system for an image display device of the first embodiment.

Seventh Embodiment

Figure 17:
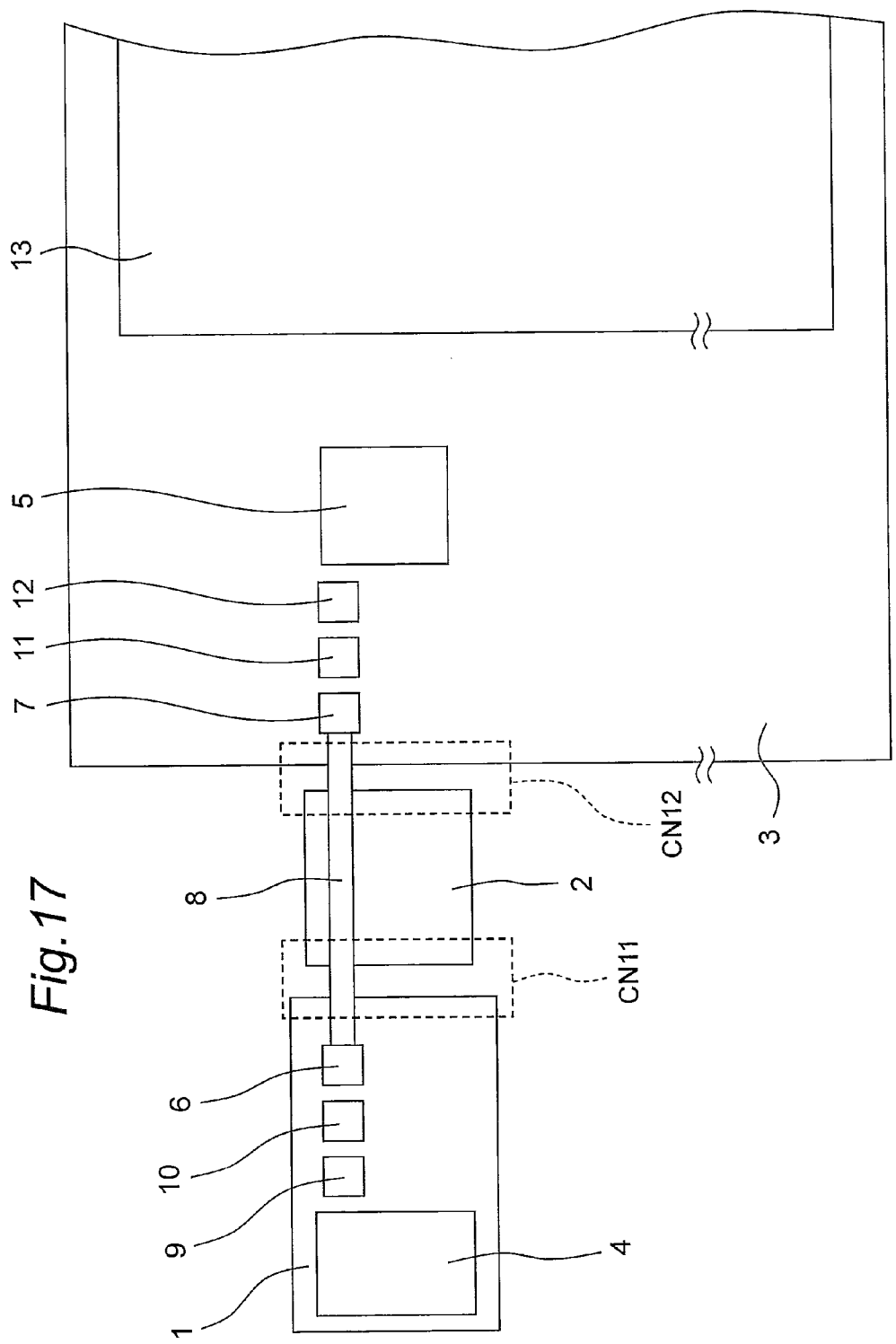
FIG. 17 is a partially broken plan view schematically showing a transmission system for an image display device of a seventh embodiment of this invention, in which an image display driver IC is mounted on a glass board by the COG method.

FIG. 17 shows a transmission system for an image display device of a seventh embodiment in which an image display driver IC 5 is connected to a glass board 3 by the COG method.

As shown in FIG. 17, an image processing IC 4, a SER 9, a driving IC 10, and a light-emitting device 6 are mounted on a circuit board 1. An optical signal emitted by the light-emitting device 6 passes through an optical connection part (refer to CN2 of FIG. 1) and propagates along an optical transmission path 8, and is received, through an optical connection part (refer to CN3 of FIG. 1), by a light-receiving device 7 mounted on the glass board 3. Both ends of the optical transmission path 8 extend beyond both ends of a flexible PWB 2 onto the circuit board 1 and the glass board 3, respectively. The light-receiving device 7, an amplifier IC 11, a DES 12, and the image display driver IC 5 are mounted on the glass board 3. The signal converted to an electrical signal in the light-receiving device 7 is amplified by the amplifier IC 11, and deserialized by the deserializer IC 12 to a data format that can be processed by the image display driver IC 5. A signal not converted to light and a power source are inputted to the image display driver IC 5 through the flexible PWB 2. Upon receiving the signal, the image display driver IC 5 drives scanning signal lines and data signal lines. The circuit board 1 and the flexible PWB 2, and the flexible PWB 2 and the glass board 3 are electrically connected by electrical connection parts CN11, CN12.

In this transmission system for an image display device, since the image display driver IC 5 is mounted on the glass board 3 by the COG method, a high-speed signal is transmitted to the glass board 3. Therefore, the structure in which the light-receiving device 7 is provided on the glass board 3 is preferred.

In addition, in the COG method, by providing the light-receiving device 7 on the glass board 3, an optical wireless structure in which light transmits through the glass board 3 can also be used.

Figure 18:
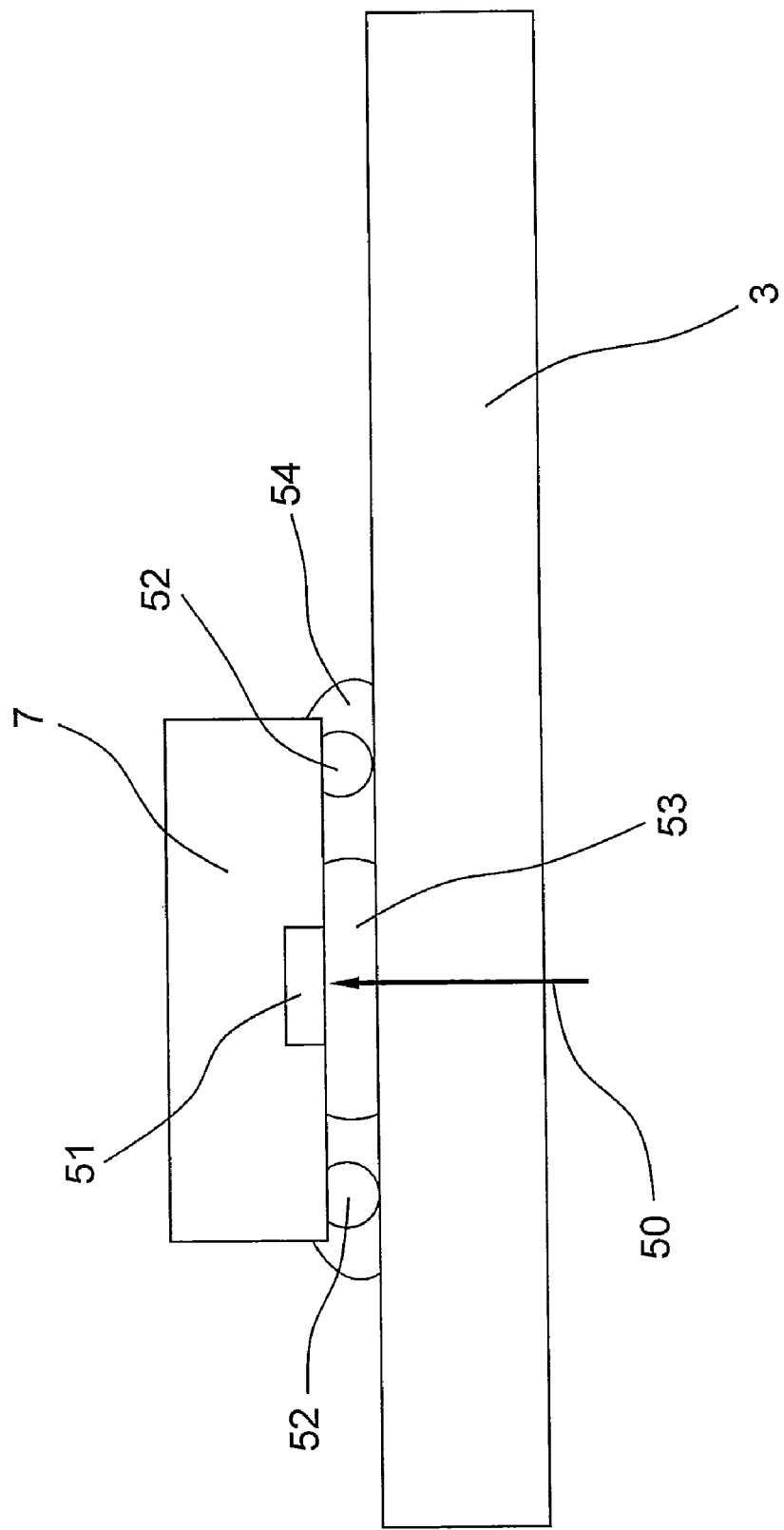
FIG. 18 is a schematic view showing a state in which a light-receiving device is mounted on the glass board by ACF.

For example, as shown in FIG. 18, the light-receiving device 7 to be connected to a circuit pattern of the glass board through an electrode 52 is mounted on the glass board 3 by an ACF 54. Therefore, there is a problem that an optical signal 50 attenuates in the ACF 54. However, if a light transmissive resin 53 is disposed in a light propagating portion between a light-receiving portion 51 of the light-receiving device 7 and the glass board 3, it is possible to suppress a reduction in optical coupling efficiency.

The transmission system for an image display device of the seventh embodiment has similar effects to those of the transmission system for an image display device of the first embodiment.

Furthermore, according to the seventh embodiment, in the case of the COG method, since those having a relatively high light transmittance are used as the first circuit board, transmission of the optical signal through a board thereof makes it possible to realize a transmission path with no bend, and signal degradation can be suppressed.

Eighth Embodiment

Next, examples of the optical COG transmission system of an eighth embodiment are shown in FIGS. 19-23.

Figure 19:
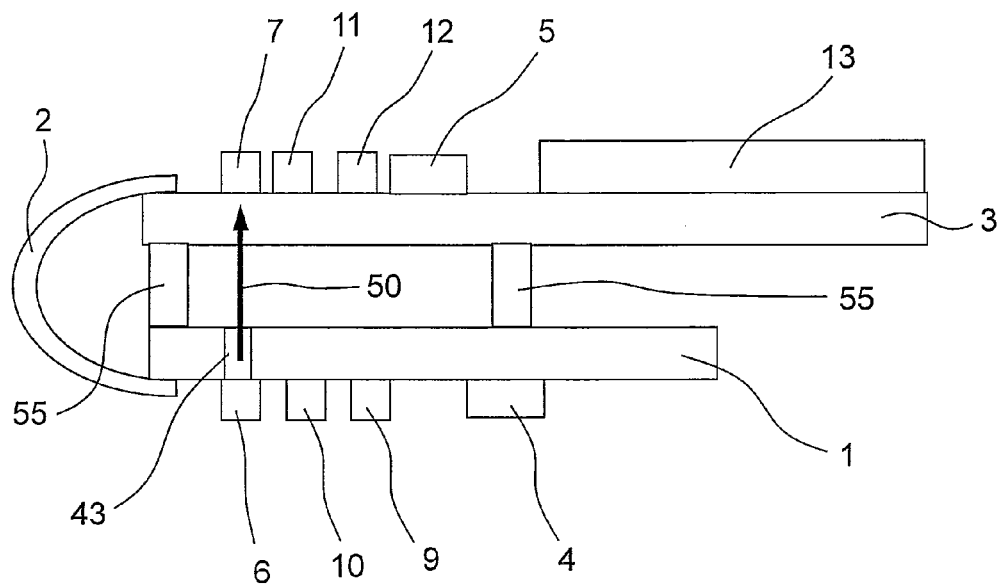
FIG. 19 is a view schematically showing the structure of a transmission system for an image display device of an eighth embodiment, in which a light-emitting device is mounted on a circuit board.

In the structure of a transmission system for an image display device of FIG. 19, a light-receiving device 7, an amplifier IC 11, a DES 12, an image display driver IC 5, and a display panel 13 are mounted on a glass board surface 3. One end of a flexible PWB 2 is connected to the glass board 3 surface. On the other hand, a light-emitting device 6, an image processing IC 4, a SER 9, and a driving IC 10 are mounted on a back surface of a circuit board 1. The other end of the bent flexible PWB 2 is connected to the back surface of the circuit board 1. The glass board 3 and the circuit board 1 are connected to each other with a predetermined spacing therebetween by retainers 55, 55. A portion of the circuit board 1 opposite to the light-emitting device 6 is provided with an optical Via 43.

Thereby, an optical signal 50 from the light-emitting device 6 passes through the optical Via 43 and the glass board 3, and is inputted to the optical device 7.

In the transmission system for an image display device, the light-emitting device 6 is mounted on the circuit board 1, and a relative position between the circuit board 1 and the glass board 3 is regulated by the retainers 55, 55, whereby alignment of the light-emitting device 6 to the light-receiving device 7 is performed. Fixation with the retainers 55, 55 is performed in an assembling process.

Figure 20:
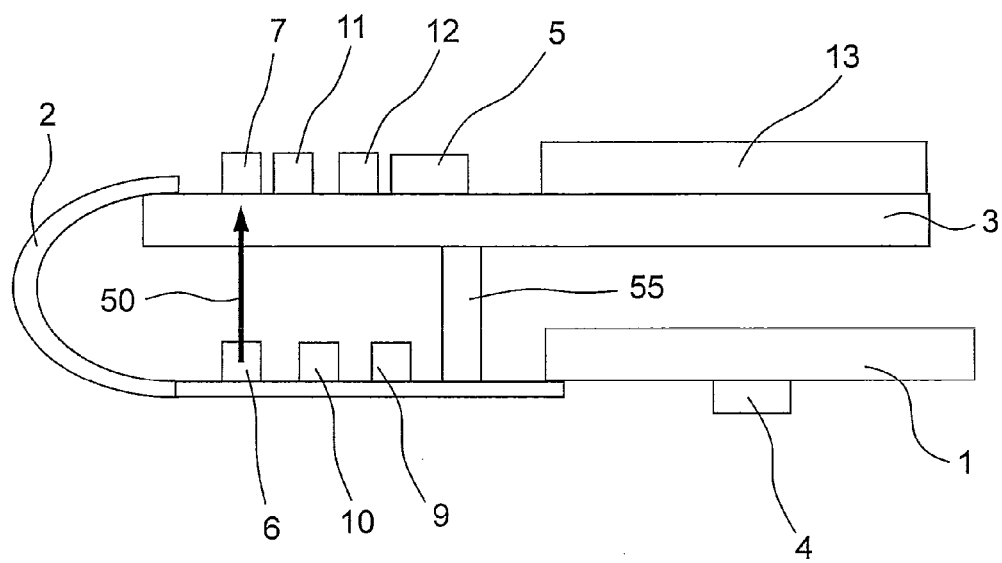
FIG. 20 is a view schematically showing the structure of a transmission system for an image display device, in which the light-emitting device is mounted on a flexible PWB.

In the structure of the transmission system for an image display device of FIG. 20, the light-receiving device 7, the amplifier IC 11, the DES 12, the image display driver IC 5, and the display panel 13 are mounted on the glass board 3 surface. One end of the flexible PWB 2 is connected to the glass board 3 surface. On the other hand, the image processing IC 4 is mounted on the back surface of the circuit board 1, and the other end of the bent flexible PWB 2 is connected to the back surface of the circuit board 1. The light-emitting device 6, the SER 9 and the driving IC 10 are mounted on the surface side of the flexible PWB 2 opposite to the glass board 3. The glass board 3 and the flexible PWB 2 are connected with a predetermined spacing therebetween by the retainers 55. Thereby, an optical signal emitted from the light-emitting device 6 to the optical device 7 passes through the glass board 3 and is inputted to the optical device 7.

In the transmission system for an image display device, the light-emitting device 6 is mounted on the flexible PWB 2, and a relative position between the flexible PWB 2 and the glass board 3 is fixed by the retainers 55. In this structure, for the circuit board 1, a conventional one can be used.

Figure 21:
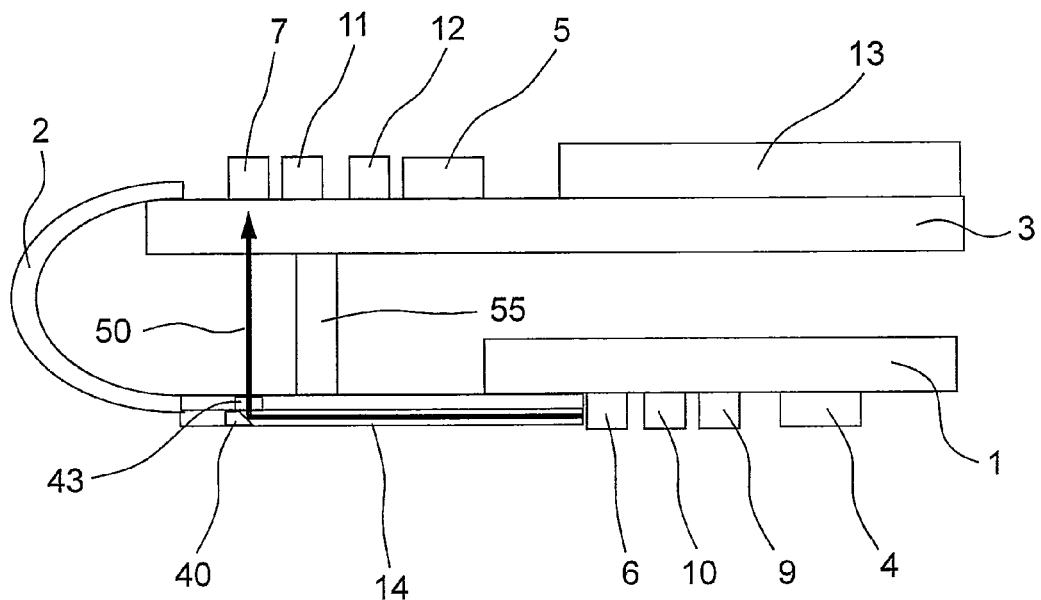
FIG. 21 is a view schematically showing the structure of a transmission system for an image display device, in which an optical signal outputted from a board integrated type optical transmission path is inputted to a light-receiving device.

FIG. 21 shows the structure of the transmission system for an image display device in which an optical signal outputted from a board integrated type transmission path 14 is inputted to the light-receiving device 7. As shown in FIG. 21, the light-receiving device 7, the amplifier IC 11, the DES 12, the image display driver IC 5, and the display panel 13 are mounted on the glass board 3 surface. One end of the flexible PWB 2 is connected to the glass board 3 surface. On the other hand, the light-emitting device 6, the image processing IC 4, the SER 9 and the driving IC 10 are mounted on the back surface of the circuit board 1. The other end of the flexible PWB 2 is connected to the back surface of the circuit board 1. On the back surface side of the flexible PWB 2, the board integrated type transmission path 14 whose one end is optically coupled to the light-emitting device 6 is provided. A reflection mirror 40 is disposed for optical path conversion at the other end of the board integrated type transmission path 14. A portion of the flexible PWB 2 opposite to the reflection mirror 40 is provided with the optical Via 43. Thereby, an optical signal 50 from the light-emitting device 6 passes through the board integrated type optical transmission path 14, the optical Via 43, and the glass board 3, and is inputted to the optical device 7.

In the transmission system for an image display device, a relative position between the flexible PWB 2 and the glass board 3 is fixed by the retainer 55. In this structure, since it is not required to dispose the light-emitting device 6 in the vicinity of the glass board 3, a degree of freedom of design in the disposition of the optical device can be enhanced.

Figure 22:
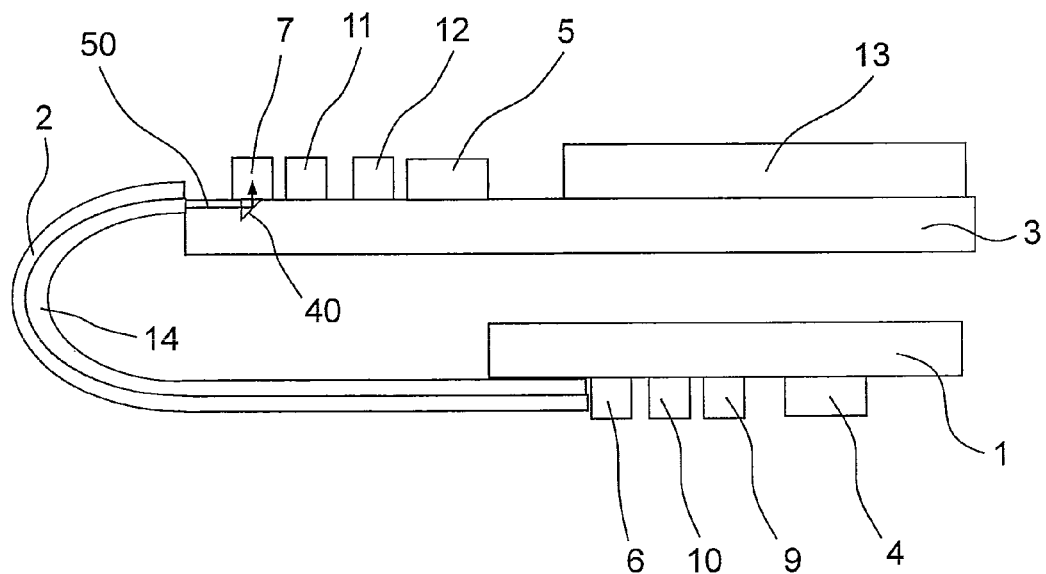
FIG. 22 is a view schematically showing the structure of a transmission system for an image display device, which requires no retainer for alignment of an optical transmission system.

Further, FIG. 22 shows the structure of the transmission system for an image display device, which requires no retainers for performing alignment in the optical transmission system. As shown in FIG. 22 the light-receiving device 7, the amplifier IC 11, the DES 12, the image display driver IC 5, and the display panel 13 are mounted on the glass board 3 surface. One end of the flexible PWB 2 is connected to the glass board 3 surface. On the other hand, the light-emitting device 6, the image processing IC 4, the SER 9 and the driving IC 10 are mounted on the back surface of the circuit board 1. The other end of the flexible PWB 2 is connected to the back surface of the circuit board 1. On the back surface side of the flexible PWB 2, the board integrated type transmission path 14 whose one end is optically coupled to the light-emitting device 6 is provided. The reflection mirror 40 is disposed for optical path conversion on the glass board 3. Thereby, an optical signal 50 from the light-emitting device 6 passes through the board integrated type optical transmission path 14, the glass board 3, and the reflection mirror 40, and is inputted to the optical device 7.

In the transmission system for an image display device, the glass board 3 is provided with the reflection mirror 40, and an optical signal 50 is inputted to the light-receiving device 7 from an end surface of the glass board 3. Therefore, the system has a structure that requires no retainers for performing alignment in the optical transmission system. Compared with a non-wireless system, a low height structure can be realized in the transmission system for an image display device even if an optical axis of the light-receiving device 7 is directed in the normal direction of the glass board 3.

Figure 23A:
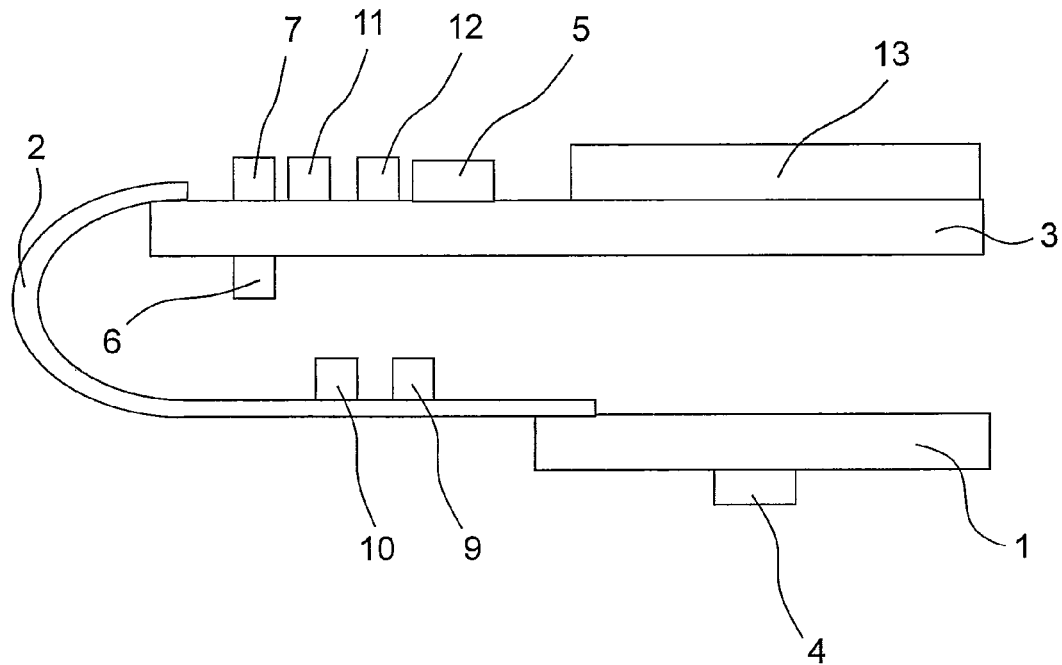
FIG. 23A is a view schematically showing the structure before assembling of the transmission system for an image display device, in which the light-emitting device is electrically connected to the flexible PWB.
Figure 23B:
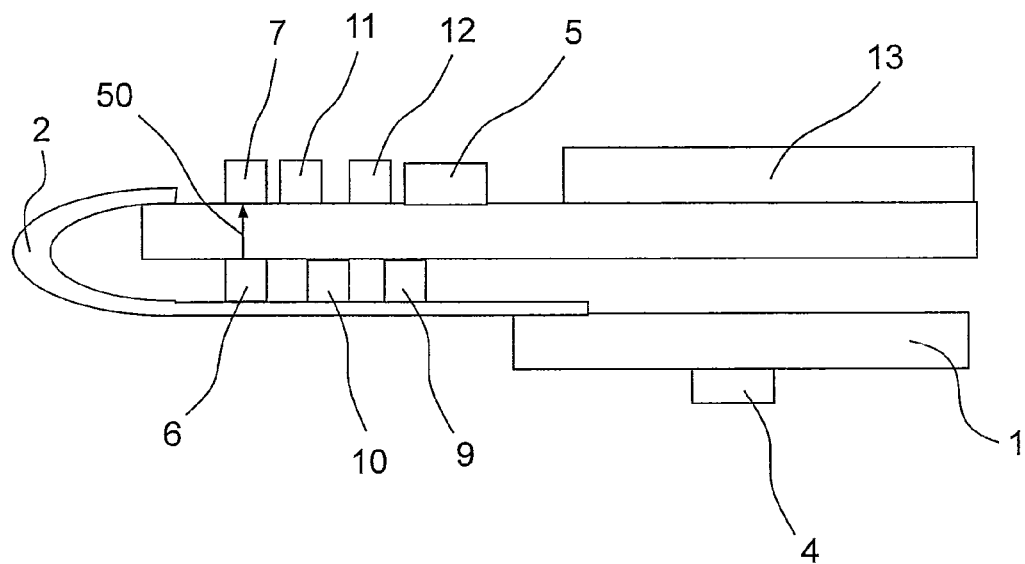
FIG. 23B is a view schematically showing the structure after assembling of the transmission system for an image display device.
Figure 24:
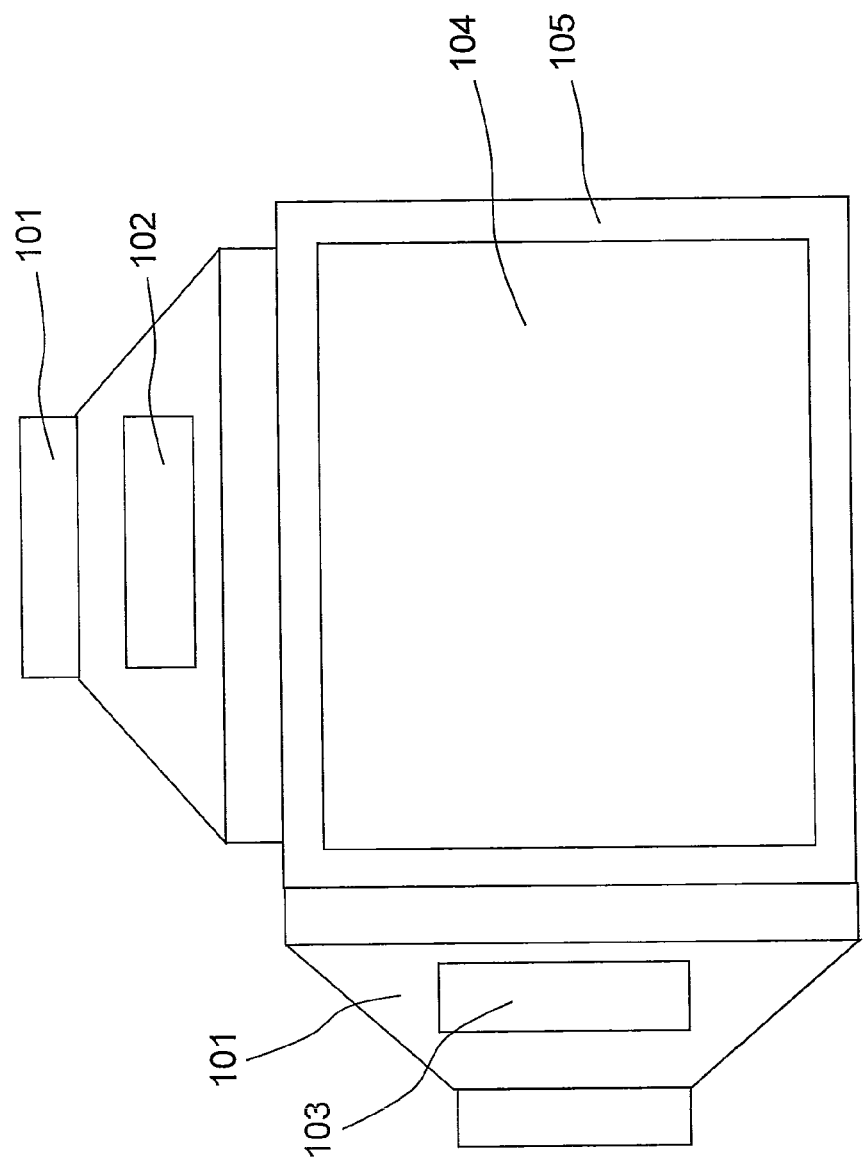
FIG. 24 is a view schematically showing a liquid crystal display device in which an image display driver IC is connected to a liquid crystal display part by the conventional TAB method.
Figure 25:
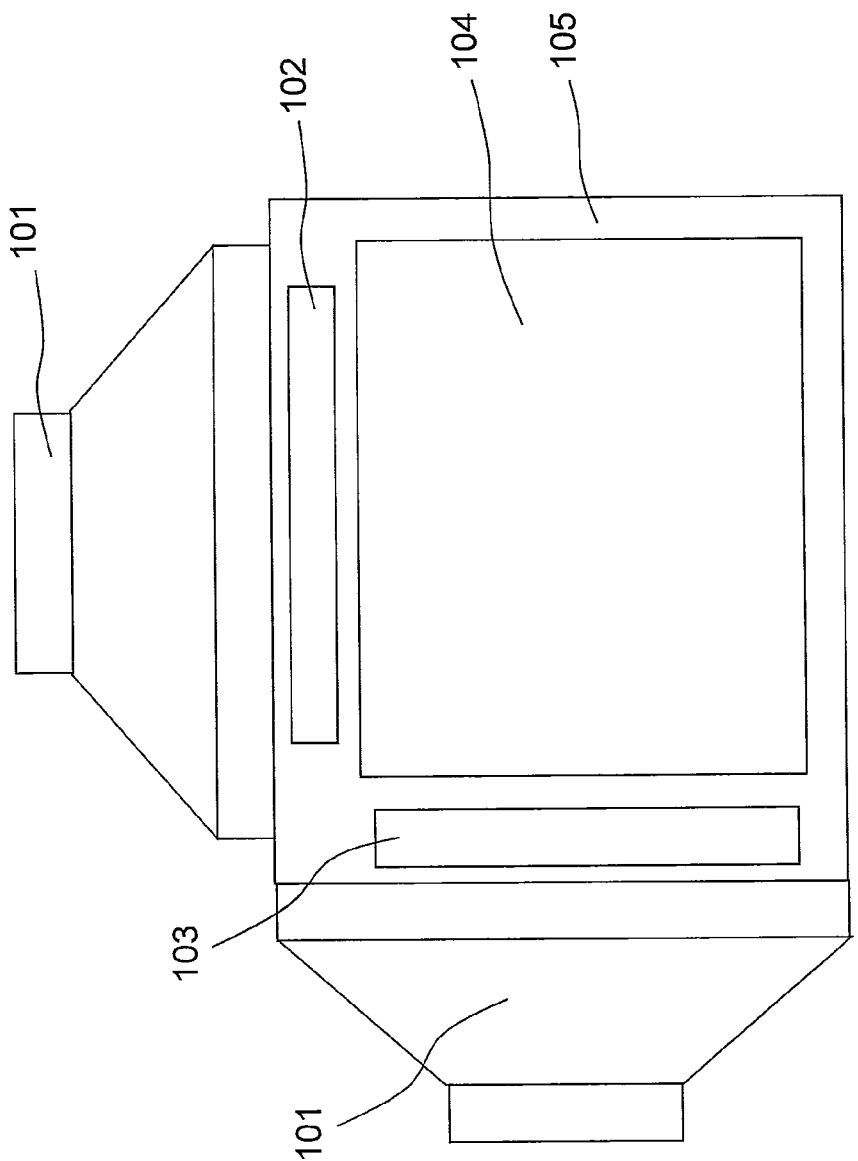
FIG. 25 is a view schematically showing a liquid crystal display device in which an image display driver IC is connected to a liquid crystal display part by the conventional COG method.

FIG. 23A shows the structure before assembling the transmission system for an image display device in which the light-emitting device and the flexible PWB are electrically connected, and FIG. 23B shows the structure after assembling the transmission system for an image display device.

As shown in FIG. 23A, the light-receiving device 7, the amplifier IC 11, the DES 12, the image display driver IC 5, and the display panel 13 are mounted on the glass board 3 surface. The light-emitting device 6 is mounted on the back surface of the glass board 3 at a position opposite to the light-receiving device 7 so that an optical signal 50 is emitted toward the light-receiving device 7 (refer to FIG. 23B). One end of the flexible PWB 2 is connected to the glass board 3 surface. Light emitted from the light-emitting device 6 passes through the glass board 3 and is inputted to the light-receiving device 7.

On the other hand, the image processing IC 4 is mounted on the back surface of the circuit board 1, and the other end of the flexible PWB 2 is connected to the back surface of the circuit board 1. On the flexible PWB 2, the SER 9 and the driving IC 10 are mounted. As shown in FIG. 23B, the circuit board 1 is made to be close to the glass board 3, and a wiring pattern (not shown) formed on the flexible PWB 2 and an electrode portion of the light-emitting device 6 are electrically connected.

FIGS. 23A and 23B show the structure of the transmission system for an image display device in which the light-emitting device 6 is mounted on the back surface of the glass board 3 in advance, and the light-emitting device 6 and the flexible PWB 2 are electrically connected in the assembling process. Therefore, a mounting position shift of the light-emitting device 6 can be suppressed.

The transmission system for an image display device of the eighth embodiment has similar effects to those of the transmission system for an image display device of the first embodiment.

Use of the transmission system for an image display device of any one of the first to eighth embodiments achieves electronic equipment having an image display device which displays a high definition, multicolor image.

The transmission system for an image display device of the present invention is applicable to image display devices used for electronic equipment such as a digital TV (television), a digital BS (Broadcasting Satellite) tuner, a CS (Communication Satellite) tuner, a DVD (Digital Versatile Disc) player, a DVD recorder, a high vision recorder, a HDD (Hard Disc Drive) recorder, a super audio CD (Compact Disc) player, an AV (Audio Visual) amplifier, audio equipment, a personal computer, personal computer peripheral equipment, a mobile phone, a PDA (Personal Digital Assistant), a game machine and the like.

Although the transmission systems for an image display device in the case where the image display device is a liquid crystal display device have been described, the transmission system for an image display device of the present invention is not limited to this, and may be applied to other image display devices such as organic EL display devices. That is, the present invention is applicable to display devices regardless of the type of the image display devices.

The aforementioned detailed description has been given only to show examples of the transmission system for an image display device of the present invention, and the present invention is not limited to those. Details of the construction, operation and the like of the transmission system for an image display device in the present embodiments may be varied as necessary as long as such variations are not to be regarded as a departure from the spirit and scope of the invention.

REFERENCE SIGNS LIST

1 . . . circuit board
2 . . . flexible PWB
3 . . . glass board
4 . . . image display IC
5 . . . image processing driver IC
6 . . . light-emitting device
7 . . . light-receiving device
8 . . . optical transmission path
9 . . . SER (serializer IC)
10 . . . driving IC
11 . . . amplifier IC
12 . . . DES (deserializer IC)
15 . . . connector
14, 14A, 14B . . . board integrated type optical transmission path
16 . . . fitting projection
17 . . . connector
17a . . . receiving portion
18 . . . fitting recess
20 . . . EO package
20a . . . receiving portion
21 . . . light-emitting portion
22 . . . V groove
23 . . . holddown jig
23a . . . V groove
24 . . . fitting projection
25 . . . mark
26 . . . resin
27 . . . fitting recess
30 . . . optical fiber
31, 31A, 31B . . . optical waveguide
32, 32A, 32B . . . cladding portion
33, 33A, 33B . . . core portion
34, 34B . . . fitting groove
34A . . . fitting projection
35 . . . mark
36 . . . V groove 40, 40A, 40B . . . reflection mirror
41 . . . reflection member
42 . . . metal film
43 . . . optical Via
50 . . . optical signal
55 . . . retainer
CN1, CN11, CN12 . . . electrical connection part
CN2, CN3, CN4 . . . optical connection part
Citation List
  Patent Literature
  Patent Literature 1: JP2008-241748 A
  The invention claimed is:

1. A transmission system for an image display device comprising:
   a first circuit board having a first surface and a second surface;
   a second circuit board having a third surface and a fourth surface, and being provided such that the third surface directly opposes the second surface;
   a flexible member for connecting the first circuit board and the second circuit board to each other;
   an image display driver IC mounted on the first circuit board or the flexible member;
   an image processing IC mounted on the second circuit board;
   a light-receiving element provided on the first surface that faces away from the second circuit board;
   a light-emitting element that emits an optical signal to be transmitted between the image display driver IC and the image processing IC, the light-emitting element being provided on the second circuit board, the optical signal being received by the light-receiving element through the first circuit board.

2. The transmission system for an image display device according to claim 1, further comprising:
   a retainer that extends between the first circuit board and the second circuit board to fix a relative position between the first and second circuit boards.

3. The transmission system for an image display device according to claim 1, wherein the second circuit board defines an optical Via, and the light-emitting element is provided on the fourth surface of the second circuit board that faces away from the first circuit board, such that the optical signal is emitted towards the first circuit board through the optical Via.

* * * * *